US007406197B2

(12) United States Patent
Francos et al.

(10) Patent No.: US 7,406,197 B2
(45) Date of Patent: Jul. 29, 2008

(54) PARAMETRIC ESTIMATION OF MULTI-DIMENSIONAL HOMEOMORPHIC TRANSFORMATIONS

(76) Inventors: Joseph M Francos, 7 Parpur Street, Lehavim (IL) 85338; Rami Hagege, 2 Hasdai Even Shifrot Street, Beer Sheva (IL)

( * ) Notice: Subject to any disclaimer, the term of this patent is extended or adjusted under 35 U.S.C. 154(b) by 190 days.

(21) Appl. No.: 10/981,943

(22) Filed: Nov. 5, 2004

(65) Prior Publication Data
US 2005/0105804 A1 May 19, 2005

Related U.S. Application Data

(60) Provisional application No. 60/604,745, filed on Aug. 25, 2004, provisional application No. 60/518,006, filed on Nov. 5, 2003.

(51) Int. Cl.
*G06K 9/62* (2006.01)
*G06K 9/68* (2006.01)
*G06K 9/32* (2006.01)
*G06K 9/36* (2006.01)

(52) U.S. Cl. ............... 382/209; 382/218; 382/284; 382/294

(58) Field of Classification Search .......... 382/209, 382/215, 217, 218, 219, 276, 289, 298, 284, 382/294
See application file for complete search history.

(56) References Cited

U.S. PATENT DOCUMENTS 5,469,512 A    11/1995  Fujita et al.

6,574,353 B1    6/2003  Schoepflin et al.
6,748,112 B1    6/2004  Nguyen et al.
2002/0181782 A1    12/2002  Monden

OTHER PUBLICATIONS

M. Miller and L. Younes, "Group Actions, Homeomorphisms, and Matching: A General Framework," *Int. Jou. Comp. Vision*, vol. 41, pp. 61-84, 2002.
L. Younes, "Tutorial: Deformation, warping and object comparison," Proc. ECCV'2000.
L. Lucchese, "A Frequency Domain Technique Based on Energy Radial Projections for Robust Estimation of Global 2D Affine Transformations," *Computer Vision and Image Understanding*, vol. 81, pp. 72-116, Feb. 2001.
J. Kybic and M. Unser, "Fast Parametric Elastic Image Registration," *IEEE Trans. Image Proc.*, vol. 12, pp. 1427-1442, Nov. 2003.

*Primary Examiner*—Bhavesh Mehta
*Assistant Examiner*—John B Strege
(74) *Attorney, Agent, or Firm*—David H. Jaffer; Pillsbury Winthrop Shaw Pittman LLP

(57) ABSTRACT

In object registration and recognition based on a set of known templates, the tremendous set of possible transformations that may relate the template and an observed signature makes any detection and recognition problem ill-defined unless this variability is taken into account. The present invention estimates the deformation that transforms some pre-chosen representation of an object (template) into the current observation. The method employs a set of non-linear operators to replace a high dimensional problem by an equivalent linear problem, expressed in terms of the unknown parameters of the transformation model. The solution is applicable to any homeomorphic transformation regardless of its magnitude. In the special case where the transformation is affine the solution is shown to be exact.

7 Claims, 8 Drawing Sheets

Two-dimensional affine transformation of $[0,1] \times [0,1]$

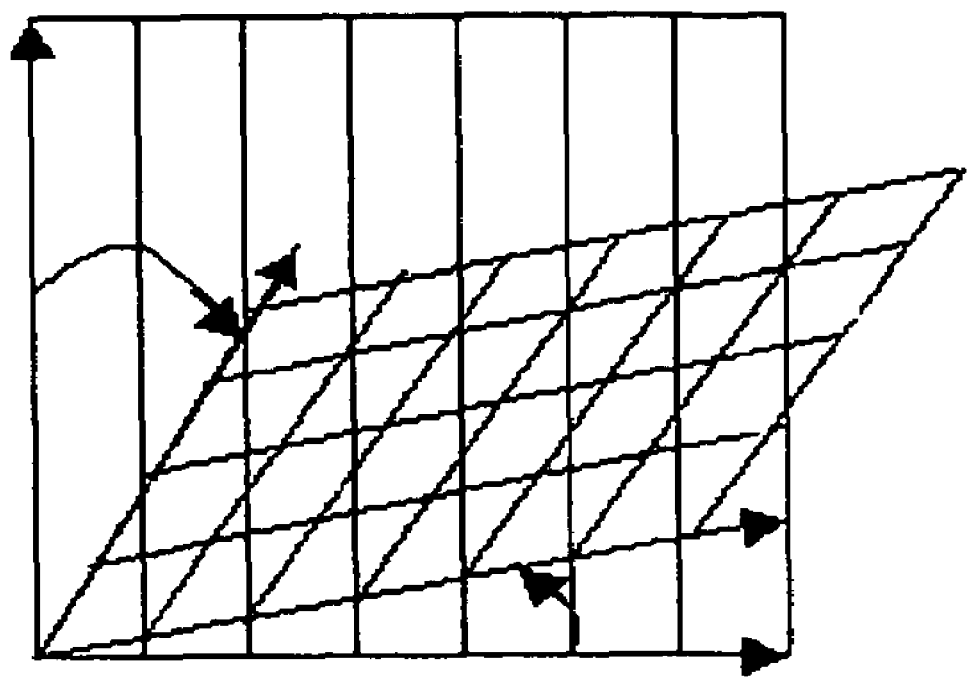
Fig. 1. Two-dimensional affine transformation of $[0,1] \times [0,1]$

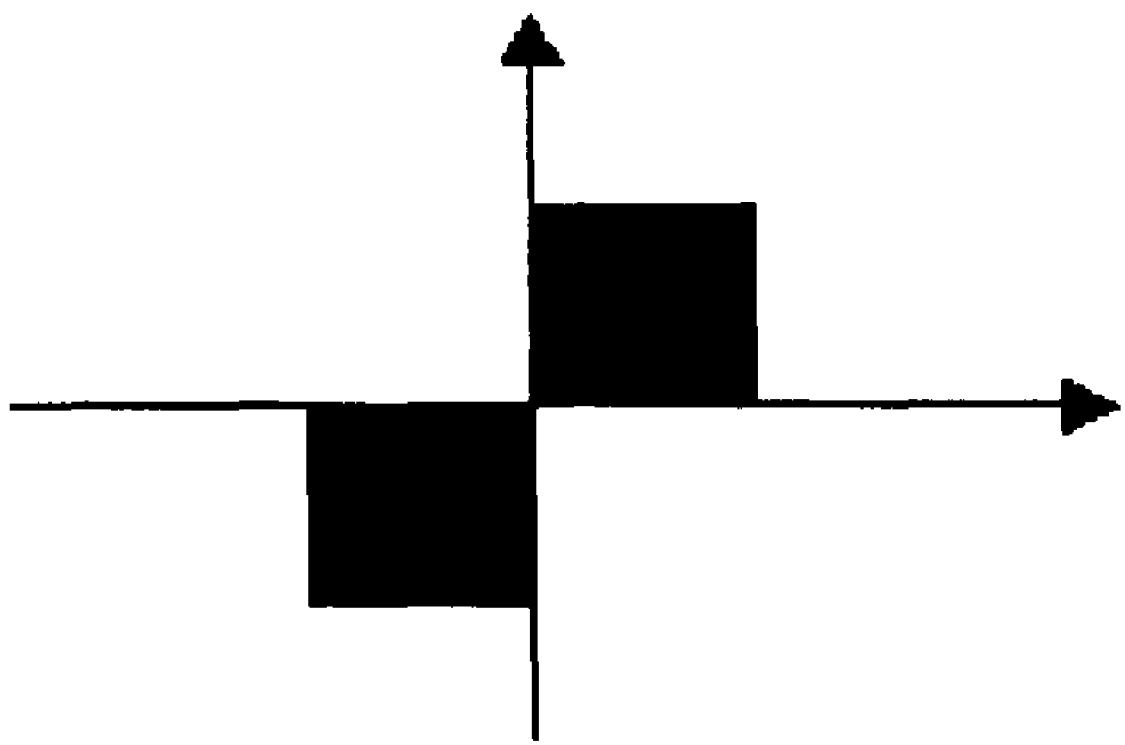
Fig. 2. The support of $g(x,y)$

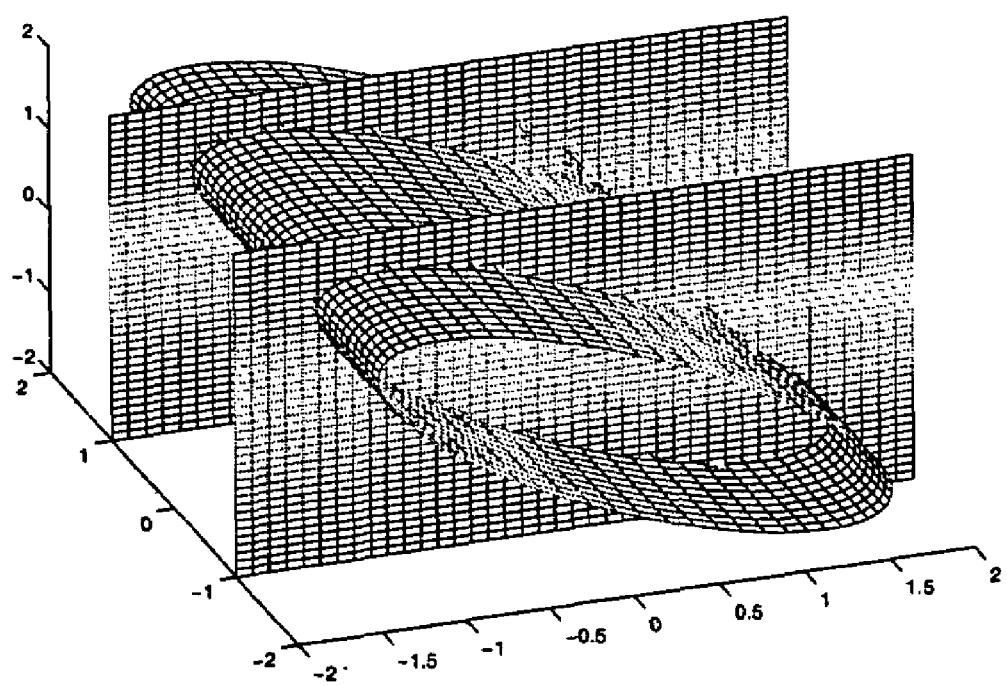
Fig. 3. Graphical interpretation of two of the constraints on the solution, obtained by applying second-order-moment constraints.

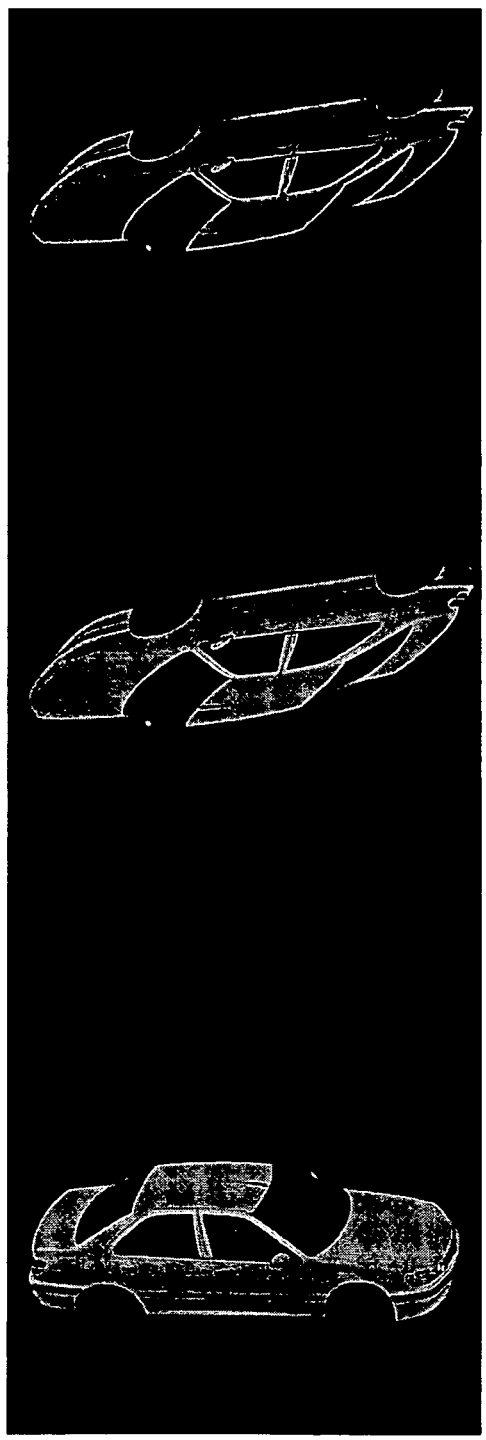
Fig. 4. From bottom to top: Template; Estimated deformed object obtained by applying the deformation estimated from the observation to the template; Observation on the deformed object.

Fig. 5. From bottom to top: Template; Estimated deformed object obtained by applying the deformation estimated from the observation to the template; Observation on the deformed object.

Fig. 6. Image of the Mona Lisa (La Gioconda). Left: after registration. Right: before registration.

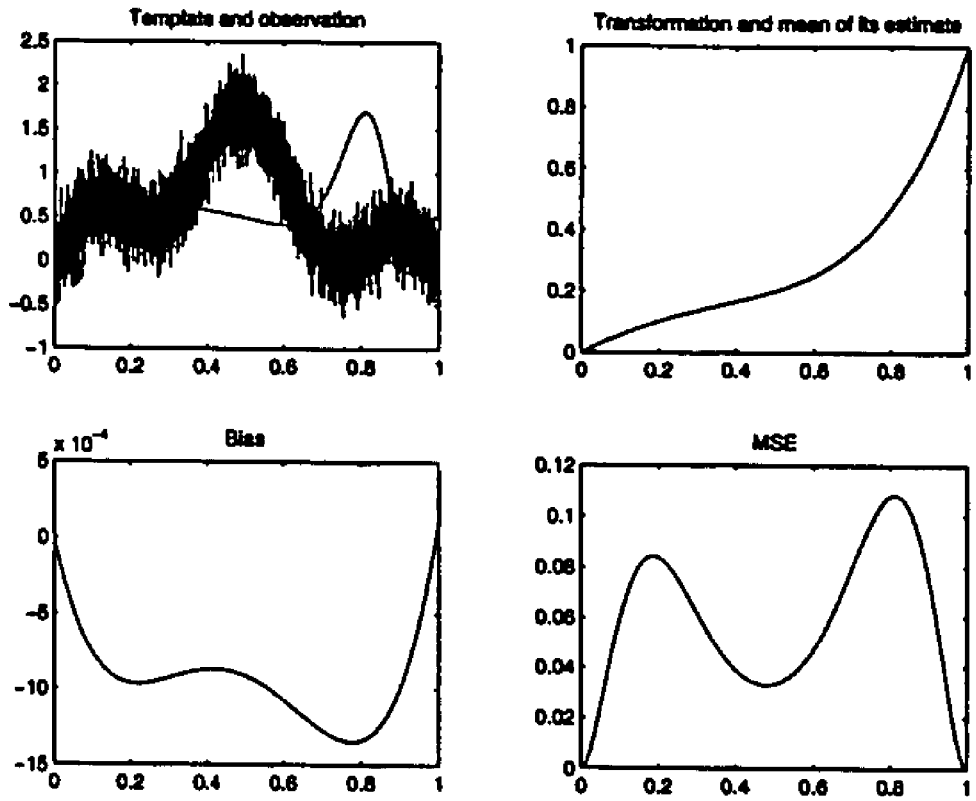
Fig. 7. The deformation function and statistics of the least-squares estimate. Clockwise from top-left: The template and a noisy observation; The deforming function (blue solid line)and the mean of its estimate (green dotted line); The bias in estimating the deformation function; The mean squared error in estimating the deformation function.

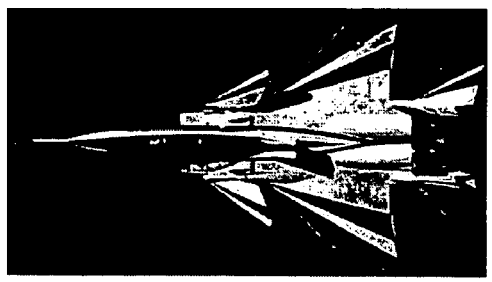
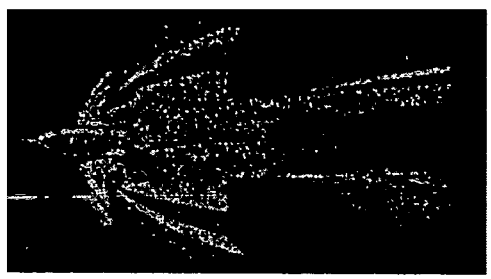
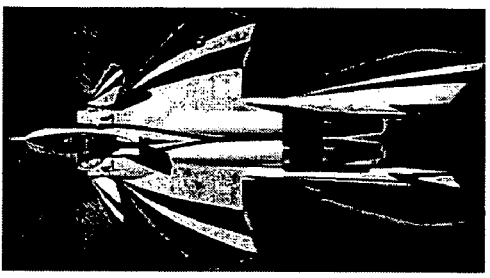
Fig. 8. From top to bottom: Template; Noisy observation on the deformed object; Estimated deformed object
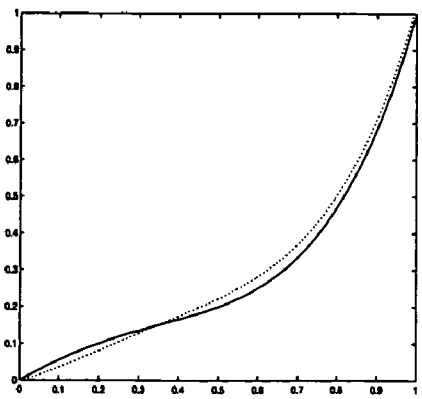
Fig. 9. The deformation function and it estimates.

PARAMETRIC ESTIMATION OF MULTI-DIMENSIONAL HOMEOMORPHIC TRANSFORMATIONS

CROSS-REFERENCE TO RELATED APPLICATIONS

This application claims the benefit of U.S. Provisional Application No. 60/518,006 filed Nov. 5, 2003 and U.S. Provisional Application No. 60/604,745 filed Aug. 25, 2004.

BACKGROUND OF THE INVENTION

1. Field of Invention

The present invention relates generally to object recognition, and more particularly to a method to deform a template of an object into an observed deformation of the object.

2. Summary of the Invention

Automated image registration is required whenever information obtained from different views of an object needs to be combined or compared. Given two images, one is looking for a transformation, such that one transformed image becomes similar to the second image. While an extensive amount of work has been done on this problem the fundamental question of how to reliably and efficiently estimate the transformation relating two images remains largely unsolved. The present invention is an approach aimed at solving directly this fundamental problem by modeling the transformation as a general continuous 2-D mapping approximated by a parametric model. It includes method for estimating the parameters of the transformation in a computationally efficient manner involving a linear estimation problem rather than an extensive search. The solution is unique and is applicable to essentially any continuous transformation regardless of the magnitude of the deformation. Once the transformation (or its inverse) has been estimated, one can map one image onto the other, i.e. perform image registration and recognition.

This provides a solution to the problem of estimating the deformation between two images, a basic building block that can facilitate the solution and implementation of many existing open problems including the general problem of automatic recognition of objects.

In automatic recognition a measured image needs to be compared to a library of templates. This problem is greatly complicated by the need to take into account the deformation between the template and the observation on the object. Using the method disclosed here, one can estimate this deformation and map the measured image so that it is ready to be matched with the template. This process will be carried out for each template in the library.

The solution has a wide range of applications to problems of interest in a wide range of areas, such as in automatic detection and recognition of deformations and anomalies in medical images; in security systems where claimed identity has to be verified by comparing an acquired image of a person or object to an existing database, or more challenging in systems where an object (such as a specific suspect) has to be identified from an input stream containing a large number of similar objects; in object based low bit rate image coding: most of the information on the moving objects in the scene can be faithfully described and tracked as a set of continuous transformations applied to a small set of templates providing the object appearance from various observation angles; or in remote sensing image registration where the problem becomes especially severe when images are taken at low angles and are therefore highly deformed by the perspective projection.

The solution is aimed at directly solving the fundamental problem common to this vast set of application areas and to many similar ones, namely estimating the deformation relating any given observed signature of the object to a pre-defined representation of it. The method provides an accurate yet computationally very simple solution to a problem for which existing solutions require an extensive numerical optimization, which is not guaranteed to provide the correct solution.

IN THE DRAWING

FIG. 1 shows a two-dimensional affine transformation of $[0,1] \times [0,1]$.

FIG. 2 shows the support of g(x,y).

FIG. 3 illustrates a graphical interpretation of two of the constraints on the solution, obtained by applying second-order-moment constraints.

FIG. 4 shows a template (bottom); an estimated deformed object obtained by applying the deformation estimated from the observation to the template (middle); and an observation on the deformed object (top).

FIG. 5 shows a template (bottom); an estimated deformed object obtained by applying the deformation estimated from the observation to the template (middle); and an observation of the deformed object (top).

FIG. 6 illustrates an image of the Mona Lisa: left, after registration, and right, before registration.

FIG. 7 shows the deformation function and statistics of the least-squares estimate.

FIG. 8 illustrates a template (top); a noisy observation on the deformed object (middle); and an estimated deformed object (bottom).

FIG. 9 illustrates the deformation function and it estimates.

DETAILED DESCRIPTION OF THE PREFERRED EMBODIMENT

This invention is concerned with the general problem of object registration and recognition based on a set of known templates. However, while the set of templates is known, the variability associated with the object, such as its location and pose in the observed scene, or its deformation are unknown a-priori, and only the group of actions causing this variablity in the observation, can be defined. This huge variability in the object signature (for any single object) due to the tremendous set of possible deformations that may relate the template and the observed signature, makes any detection and recognition problem ill-defined unless this variablity is taken into account. In other words, implicit or explicit registration of the observed object signature with respect to any template in an indexed set is an inherent and essential part of the solution to any detection and recognition problem.

The fundamental settings of the problem known as deformable templates are discussed in the literature. There are two key elements in a deformable template representation: A typical element (the template); and a family of transformations which when applied to the typical element produces other elements—the possible observations. In the simplest case transformations are rigid and are composed only of translation and rotation. When non-rigid transformations are considered the transformation group is much larger and can be represented by the group of homeomorphisms, or a subgroup of it. The set of transformations forms a group action on the space of all possible transformed templates. Thus, each observation is an element of the orbit induced by the action of the group on some pre-chosen observation on the object—the template. For multiple objects, the transformation space is best described as a union of orbits, each representing a different object and its possible deformations. Thus, given measurements of an observed object (for example, in the form of an image) recognition becomes the procedure of finding the object template that minimizes some metric with respect to the observation, either by jointly finding the group element and object template that minimize the metric, or by choosing a metric which is invariant to the group action.

To enable a rigorous treatment of the problem we begin by defining the "similarity criterion". Let G be a group and S be a set (a function space in our case), such that G acts as a transformation group on S. The action of G on S is defined by G×S→S such that for every $\phi \in G$ and every $s \in S$, $(\phi,s) \rightarrow s \circ \phi$ (composition of functions on the right), where $s \circ \phi \in S$. From this point of view, given two functions h and g on the same orbit, the initial task (that enables recognition in a second stage), is to find the element $\phi$ in G that makes h and g identical in the sense that $h = g \circ \phi$. To simplify the discussion, at this stage we exclude the case of "self-similar" functions, i.e., functions $f \in S$ for which there exists some $\phi \in G$ such that $\phi$ is not the identity element while $f = f \circ \phi$.

To better illustrate the approach consider the following examples:

$$S_1 = \{f: R \rightarrow R | f \text{ measureable and bounded}\} \quad G_1 = \{\phi: R \rightarrow R | \phi(x) = ax+b, a \neq 0\} \quad 1.$$

In this setting the objects are measurable and bounded functions from the real line to itself and the group is the group of linear non-singular transformations. (Non-singularity is essential for having the structure of a group). Let s be an object in $S_1$. The group action defined by $G_1$ implies that the only transformations s can undergo are uniform scaling of its x-axis and shift. Consider now the entire family $\{s \circ \phi | \phi \in G_1\}$ which is the family of functions induced from the single object s (the orbit). Thus, given some other element in this family we would like to know what object it is, and in what position it is relative to s. If a time dependent sequence is provided, we would like to track its evolvement as a function of time.

$$S_2 = \{f: R \rightarrow R | f \text{ measureable and bounded}\} \quad G_2 = \{\phi: R \rightarrow R | \phi \text{ homeomorphism}\} \quad 2.$$

Since $G_2$ is a group of homeomorphisms, the types of possible deformations are unlimited for any practical purpose, and include the invertible non-uniform one-dimensional transformations.

$$S_3 = \{f: R^2 \rightarrow R | f \text{ measureable and bounded}\}$$
$$G_3 = \{\phi: R^2 \rightarrow R^2 | \phi \in SO_2(R) \bigotimes R^2\} \quad 3.$$

This is one of the simplest examples when two-dimensional domains are being considered. In this example the group action model only allows the objects to be rotated or translated from their "original" position. Thus the objects in this framework are all "rigid".

$$S_4 = \{f: R^2 \rightarrow R | f \text{ measureable and bounded}\}$$
$$G_4 = \{\phi: R^2 \rightarrow R^2 | \phi \in GL_2(R) \bigotimes R^2\} \quad 4.$$

This is a generalization of the previous example, yet the deformations the object may undergo can still be modeled as linear transformations.

$$S_5 = \{f: R^2 \rightarrow R | f \text{ measureable and bounded}\} \quad G_5 = \{\phi: R^2 \rightarrow R^2 | \phi \text{ homeomorphism}\} \quad 5.$$

In this world deformations are invertible and, in general, non-uniform. The deformations are essentially not restricted, provided that the object is not torn apart. Extensions to higher dimensional object models are straightforward.

Consider next the family of simple functions with triangular support, i.e., $f \in S_3$ such that $f$ is one on some triangle in $R^2$ and zero otherwise. In $(S_3, G_3)$ only rigid transformations are allowed. Thus in general, two different simple functions with triangular support define two different functions in $S_3$. Two functions are $G_3$-similar if and only if they are congruent in the usual Euclidian sense. However, when the geometry induced by $(S_4, G_4)$ is considered, all simple functions with triangular support are $G_4$ similar since each of the lines defining the triangular support is mapped by a transformation in $GL_2(R)$ to a line in $R^2$, and the intersections of these transformed lines define a triangular support. Similarly, all simple functions with parallelogram support are $G_4$-similar. (However simple functions with parallelogram support are not $G_4$-similar to simple functions with triangular support.) Yet when $(S_5, G_5)$ is considered, all simple functions with convex support are $G_5$-similar.

The above setting enables formalization of practical questions using a rigorous setting:

1. Motion Analysis: Is the problem of estimating the group action as a function of time so that at each instant the correct group element that acts on the object is identified. (In some cases it is possible to add topological structure to the group or even an analytic structure (Lie groups) that enables the tracking of continuous or differentiable motions.)
2. Detection and Recognition: Is the task of finding the equivalence class of the given object, thus identifying the orbit associated with this object.

This disclosure concentrates on parametric modeling and estimation of homeomorphic transformations. Theoretically, in the absence of noise, the solution to the registration problem is obtained by applying each of the deformations in the group to the template, followed by comparing the result to the observed realization. In the absence of noise, application of one of the deformations to the template yields an image, identical to the observation. Thus the procedure of searching for the deformation that transforms g into h is achieved, in principle, by a mapping from the group to the space of functions defined by the orbit of g. However, as the number of such possible deformations is infinite, this direct approach is computationally prohibitive. Hence, more sophisticated methods are essential.

Intuitively, it seems that the simplest way to relate any two objects, where one is assumed to be a deformed version of the other, is by associating ordered coordinate sequences of labeled points, known as landmarks, on the two objects. Each such landmark point is being associated with a specific, identifiable feature in the image domain. Thus, the shape of an object is described by the configuration of the landmark points that are projected onto the image plane. The key concept, common to all such methods is that the points are labeled such that we know the correspondence between feature points across different images. Therefore, to make this approach feasible, the correspondence problem must be solved first. This approach may be feasible when the deformation is close enough to the identity, the number of features is relatively small (for combinatoric reasons), and there is a strong contextual evidence to guide the solution to the correspondence problem. Yet, in many problems the feature points are not easily identifiable, and their number may be large—in which case the correspondence problem rapidly becomes very difficult to solve.

As already indicated above, sets of landmarks are only the simplest type of objects that can be compared in order to evaluate the unknown deformation. "Continuous" objects such as curves describing the boundaries of shapes, or images of surfaces are employed as well. Existing approaches for solving the deformation estimation problem from observations on continuous objects proceed by defining a cost function on the space of deformations considered. This cost function penalizes both the 'distance' between the deformed template and the observation, and a measure of the 'size' of the deformation. The aim is then to find the deformation that minimizes the cost. Thus, the most common approach for solving the problem of estimating the transformation parameters is metric based. For example, in the case where the transformation is affine this procedure is implemented by employing a search for the matrix A and vector c∈$R^n$ that minimize some predefined metric d on the space of functions, i.e., $(\hat{A},\hat{c})=\text{argmin}_{A\in GL_n(R),c\in R^n} d(h(x),g(Ax+c))$. After choosing the metric d in a sense that has its justification in the concrete problem at hand, usually the solution is obtained using some optimization procedure to find the locally optimal $(\hat{A},\hat{c})$ minimizing the distance d (h(x), g(Ax+c)). As indicted above, sometimes existence of a-priori knowledge about the specific problem, enables us to quantify the "distance" between the desired solution and the identity transformation. Assuming for simplicity the translation is zero, this a-priori knowledge is described as a cost function (usually a metric) on $GL_n(R)$, which we will denote by $d_{GL_n(R)}$. In such cases the solution for the transformation matrix is formalized as the solution to the problem of minimizing $d(h(x),g(Ax))+d_{GL_n(R)}$(I,A) over all $A\in GL_n(R)$. Thus, even in the relatively simple case where the transformation is affine, the resulting optimization problems are highly nonlinear and nonconvex, and the only algorithms that can be applied are computationally expensive numerical methods that are not guaranteed to find the optimal solution.

In order to reduce some of the computational complexity of these variational methods, parametric models representing the deformation by spanning it over a set of basis function with unknown coefficients have been suggested. Examples include where B-splines are employed, where polynomial bases are adopted, and where harmonic basis functions have been chosen.

The main advantage of the metric-based methods over the landmarks approach is that they avoid the need to find landmarks which, as indicated above, is a tough and not always well defined problem. Moreover, in real world applications automatic identification of the landmarks when the deformation is far from the identity is a highly complicated task. On the other hand the main advantage of landmark based methods over metric-based continuous methods is that theoretically they will not be attracted to a local solution. Composite methods have also been suggested.

For the case where the deformation is affine, while assuming the deformation is small and the observations differentiable, a widely used approach is to linearize the problem using a first order Taylor series expansion. The major advantage of this approach is that in case the deformation is indeed small, a solution to the problem of estimating the affine transformation parameters is formulated as a solution to a system of linear equations. This method is elaborated in Section 6, comparing it to the method disclosed in the present invention. The method of the present invention also provides a solution to the problem of finding the transformation parameters by solving a system of linear equations. However, this new method, that originates from entirely different considerations, is exact and not approximate, while being applicable to deformations of any size. Moreover the deformations are not restricted to be affine but rather belong to the much larger class of homeomorphic deformations.

Spectral domain approaches for estimating the affine transformation parameters have also been investigated. These methods first transform the pair of object images into the Fourier plane, where the relation between the absolute values of the Fourier transforms is affine but is independent of translations, as translations are related only to the phase. This introduction only briefly classifies and reviews the "mainstream" registration methods.

The method of the present invention, although it employs the continuous nature of the information in the observations on both the template and object, cannot be cataloged into any of the above outlines. The center of the solution of the present invention is a method to replace the high dimensional and computationally intensive problem of evaluating the orbit created by applying to any given template in the database the whole set of transformations in the group, by an equivalent linear problem expressed in terms of the unknown parameters of the transformation model. In this setting, the problem of finding the parametric model of the deformation is mapped, by a set on non-linear operators, into a set of linear equations which is then solved for the transformation parameters. The solution is unique and exact and is applicable to any homeomorphic transformation regardless of the magnitude of the deformation.

For the case where the transformation is affine, this solution is further extended to include the case where the deformation relating the observed signature of the object and the template, is composed both of the geometric deformation due to the affine transformation of the coordinate system and a constant illumination change.

The structure of Part A of the disclosure below is as follows: It begins by rigorously defining the scope of the problem of finding the affine transformation parameters, given an observation h and a template g of a planar object, where the two are known to be related through an affine transformation. To simplify the notations, the description in Section 2 assumes that the translation is null and considers the problem of finding $A\in GL_n(R)$, given the observations on h and g. Then, Section 3 uses a least squares approach to solve the problem of estimating the parameters of the affine transformation model, for the case where the model is only an approximation of the true physical distortion. In Section 4 the algorithm for finding the affine transformation parameters is extended so that A, and the translation vector are jointly estimated. Section 5 further extends the framework of the model and considers the case where h(x)=ag(Ax+c), where a is an unknown illumination gain so that both a, A and c are unknown and need to be determined. The derivation in the previous sections is further extended in Section 6 to handle the case where the affine transformation changes with time, while the given template g is fixed in time. Sections 7, 8 and 9 consider the problem of estimating the parameters of the affine transformation when the observation is subject to an additive noise. In Section 7 the least square estimator is derived and is further analyzed for a specific choice of the employed nonlinear operators. Section 8 derives the first and second order statistics of the proposed solution, assuming the signal to noise ratio is high. Under this assumption, Section 9 then derives a maximum likelihood estimation algorithm for the affine transformation parameters. In Section 10 presents some numerical examples to illustrate the operation and robust performance of the proposed parameter estimation algorithm, for a broad range of affine deformations.

Part A: Affine Transformations

1. Estimation of Multidimensional Affine Transformations

1.1. The Two-Dimensional Affine Transformation

We begin by defining the geometry of the transformation for the case where the transformed objects are two-dimensional. Extensions to the n-dimensional case are immediate, as we show throughout. More specifically, let D be a compact subset of $R^2$ and let $g:D \to R$ be a Lebesgue measurable and bounded function. Let also $GL_2(R)$ denote the group of real valued invertible 2×2 linear transformations. Let A be some matrix in $GL_2(R)$ and let s be a two-dimensional vector representing the shift operation. Applying the transformation A to every $(x,y) \in D$ followed by shifting the result by s, defines a new compact subset of $R^2$, that we denote by $D_A$. FIG. 1 illustrates the result of applying such a transformation, with s=0, to the basis vectors $[1,0]^T, [0,1]^T$, and the result of applying the affine transformation A to the domain $D=[0,1] \times [0,1]$, where the transformed basis vectors are now given by $[a_{11}, a_{21}]^T, [a_{12}, a_{22}]^T$, respectively.

In the following we will be interested in obtaining the affine transformation parameters, given the "surface shape" $g:D \to R$, and the surface shape, $h:D_A \to R$. which is the shape of the same surface, as measured after the coordinate transformation. The next subsection provides a rigorous definition of the more general n-dimensional problem.

1.2. Estimation of Multidimensional Affine Transformations: Problem Definition The basic problem addressed in this disclosure is the following: Given two bounded, Lebesgue measurable functions h, g with compact supports, and with no affine symmetry (as rigorously defined below), such that $$h:R^n \to R$$

$$g:R^n \to R$$

where $$h(x)=g(Ax), A \in GL_n(R), x \in R^n \quad (1)$$

find the matrix A. Thus, to simplify the notations we first assume that translation is null and consider the problem of finding A, given the observations on h and g. In Section 4 the algorithm for finding the affine transformation parameters is extended so that A, and the translation vector are jointly estimated. In Section 5 we further extend the framework of the model and consider the case where $h(x)=ag(Ax+c)$, where a is an unknown illumination gain so that both a, A and c are unknown and need to be estimated.

Let $M(R^n,R)$ denote the space of compact support, bounded, and Lebesgue measurable functions from $R^n$ to R. Let x,c be vectors in $R^n$. Let $N \subset M(R^n,R)$ denote the set of measurable functions with an affine symmetry (or affine invariance), i.e., $N = \{f \in M(R^n,R) | \exists A \in GL_n(R), c \in R, (A,c) \neq (I,0) \text{ such that } f(x) = f(Ax+c) \text{ for every } x \in R^n\}$. (Thus, N is the set of functions in $M(R^n,R)$, stable under at least one element of the affine group. Obviously for any $f \in N$ and A,c such that $f(x)=f(Ax+c)$ for every $x \in R^n$, A,c cannot be uniquely recovered). Note however that functions with compact support are not translation nor scale invariant. Hence the scope of the above affine symmetry definition is in fact wider than the one encountered when discussion is limited to functions with compact support.

To illustrate the notion of N consider the following example (although $f$ does not have a compact support): Let $$f(x) = \begin{cases} 1 & x \in [2^n, 2^n + 2^{n-1}] \forall n \in Z \\ 0 & \text{else} \end{cases}$$

This function satisfies the relation $f(x)=f(2x)$ but clearly there is no hope to make any distinction between $f(A_1 x) = f(2A_1 x) \forall A_1 \in R$. Hence, $f \in N$.

Other examples of affine invariant functions include any constant function defined on all of $R^n$; any periodic function defined on all of $R^n$; and in the two dimensional case, the functions with radial symmetry (as $SO_2(R) \subset GL_2(R)$).

Assume c=0. Let $$M_{Aff}(R^n, R) \triangleq M(R^n, R),$$

N denote the set of compact support and bounded Lebesgue measurable functions with no affine symmetry. Next, partition $M_{Aff}(R^n,R)$ into affine equivalence sets by the equivalence relation $h \square g \Leftrightarrow \exists A \in GL_n(R) | h(x) = g(Ax)$. (It can be easily checked that this is indeed an equivalence relation). Denote the quotient space by $Q_{Aff}(R^n,R)$, and let [g] denote the equivalence set of g.

Lemma 1. Let $g \in M_{Aff}(R^n,R)$. Assume $h(x)=g(Ax)$. Then the transformation $A \in GL_n(R)$ satisfying the relation $h(x)=g(Ax)$, is unique. Proof. Assume the statement is false. Hence, there exist two transformations A and B where $A \neq B$, such that $h(x)=g(Ax)$ and $h(x)=g(Bx)$. However, $h(x)=g(Bx)$ implies $g(x)=h(B^{-1}x)=g(AB^{-1}x)$ where $AB^{-1} \neq I$. Hence, $g \in N$ which is a contradiction.

Thus, an equivalent statement of the estimation problem, stated at the opening of this section is as follows: Given any two objects $h,g \in M_{Aff}(R^n,R)$ that satisfy an affine relation $A \in GL_n(R)$, i.e., $[h]=[g]=q$, for some $q \in Q_{Aff}(R^n,R)$, find A.

The direct approach for solving the problem of finding the parameters of the unknown transformation $A \in GL_n(R)$ is to apply the set of all possible affine transformations, (i.e., every element of $GL_n(R)$), to the given template g, thus evaluating the orbit of g which represents the action of the group on the template. Since h and g are affine related, one of the points on the orbit represents the action of the desired group element A. Nevertheless, since A is an n×n matrix it is clear that implementation of such a search on the orbit requires a search over an $n^2$-dimensional manifold embedded in an infinite dimensional function space, which is infeasible.

This disclolsure shows that the problem of finding the parameters of the unknown affine transformation, whose direct solution requires a highly complex search in a function space, can be formulated as a parameter estimation problem. Moreover, it is shown that the original problem can be formulated in terms of an equivalent problem which is expressed in the form of a linear system of equations in the unknown parameters of the affine transformation. A solution of this linear system of equations provides the unknown transformation parameters. In the next section we show how the problem of finding the parametric model of the affine deformation can be transformed using a set on non-linear operators into a set of linear equations which is then solved for the transformation parameters.

2. An Algorithmic Solution

In this section we specify the conditions, and provide a constructive proof showing that given an observation on h(x)

$\in M_{Aff}(R^n,R)$ and an observation on $g(X) \in M_{Aff}(R^n, R)$ where $h(x)=g(Ax)$, A can be uniquely determined. Moreover, it is shown that almost always the solution for the unknown parameters of the affine transformation is obtained by solving only a linear system of equations. Let, $x,y \in R^n$, i.e., $$x = [x_1, x_2, \ldots, x_n]^T \quad (2)$$
$$y = [y_1, y_2, \ldots, y_n]^T$$

Thus, $$y = Ax, \, x = A^{-1}y$$

where $$A = \begin{pmatrix} a_{11} & \cdots & a_{1n} \\ \vdots & \ddots & \vdots \\ a_{n1} & \cdots & a_{nn} \end{pmatrix} \quad A^{-1} = \begin{pmatrix} q_{11} & \cdots & q_{1n} \\ \vdots & \ddots & \vdots \\ q_{n1} & \cdots & q_{nn} \end{pmatrix}$$

Since $A \in GL_n(R)$, also $A^{-1} \in GL_n(R)$. It is therefore possible to solve for $A^{-1}$ and the solution for A is guaranteed to be in $GL_n(R)$. Moreover, as shown below, in the proposed procedure the transformation determinant is evaluated first, and by a different procedure than the one employed to estimate the elements of $A^{-1}$. Hence, a non-zero Jacobian guarantees the existence of an inverse to the transformation matrix.

Let $f \in M_{Aff}(R^n,R)$ and let $\mu_n$ denote the Lebesgue measure on $R^n$. Define the notation $$\int_{R^n} f = \int_{R^n} f \, d\mu_n$$

Note that in the following derivation it is assumed that the functions are bounded and have compact support, as they are measurable but not necessarily continuous. It is further assumed that $A \in GL_n(R)$ has a positive determinant.

The first step in the solution is to find the determinant of the matrix A. A simple approach is to evaluate the Jacobian through the identity relation:

$$\int_{R^n} h^2(x) = \int_{R^n} g^2(Ax) = |A^{-1}| \int_{R^n} g^2(y) \quad (3)$$

or through similar identities. Hence, $$|A^{-1}| = \frac{\int_{R^n} h^2(x)}{\int_{R^n} g^2(y)} \quad (4)$$

and $|A^{-1}|=|A|^{-1}$. In the second stage we prove that, provided that g is "rich" enough in a sense we rigorously define below, $A^{-1}$ can be uniquely estimated by establishing n linear and independent constrains on the n elements in each of its rows. More specifically, let $(A^{-1})_k$ denote the k th row of $A^{-1}$. We then have $$\int_{R^n} x_k h(x) = \quad (5)$$

-continued $$\int_{R^n} x_k g(Ax) = |A^{-1}| \int_{R^n} ((A^{-1})_k y) g(y) = |A^{-1}| \sum_{i=1}^n q_{ki} \int_{R^n} y_i g(y)$$

To solve for $\{q_{ki}\}_{i=1}^n$, more constrains must be added. Towards this goal, apply a family of Lebesgue measurable, left-hand compositions $\{w_l\}:R \to R$ to the known relation $h(x) = g(Ax)$, to yield $$w_l \circ h(x) = w_l \circ g(Ax) \quad (6)$$

Integrating over both sides of the equality in (6), similarly to (5) we obtain $$\int_{R^n} x_k w_l \circ h(x) = \quad (7)$$

$$|A^{-1}| \int_{R^n} ((A^{-1})_k y) w_l \circ g(y) = |A^{-1}| \sum_{i=1}^n q_{ki} \int_{R^n} y_i w_l \circ g(y)$$

which yields when written in a matrix form the system $$\begin{pmatrix} \int_{R^n} y_1(w_1 \circ g(y)) & \cdots & \int_{R^n} y_n(w_1 \circ g(y)) \\ \vdots & \ddots & \vdots \\ \int_{R^n} y_1(w_n \circ g(y)) & \cdots & \int_{R^n} y_n(w_n \circ g(y)) \end{pmatrix} \begin{pmatrix} q_{k1} \\ \vdots \\ q_{kn} \end{pmatrix} = \quad (8)$$

$$\begin{pmatrix} |A| \int_{R^n} x_k(w_1 \circ h(x)) \\ \vdots \\ |A| \int_{R^n} x_k(w_n \circ h(x)) \end{pmatrix}$$

Similar system of equations is solved for each k to obtain the entire matrix $A^{-1}$ and thus A itself.

We have just proved the following theorem:

Theorem 1. Let $A \in GL_n(R)$. Assume $h,g \in M_{Aff}(R^n,R)$ such that $h(x)=g(Ax)$. Then, given measurements of h and g, A can be uniquely determined if there exists a set of measurable functions $\{w_l\}_{l=1}^n$ such that the matrix $$G = \begin{pmatrix} \int_{R^n} y_1(w_1 \circ g(y)) & \cdots & \int_{R^n} y_n(w_1 \circ g(y)) \\ \vdots & \ddots & \vdots \\ \int_{R^n} y_1(w_n \circ g(y)) & \cdots & \int_{R^n} y_n(w_n \circ g(y)) \end{pmatrix} \quad (9)$$

is full rank.

Remark: Note that the denominator of (4), as well as the elements of the matrix G depend only on the template and its coordinate system and thus have to be evaluated only once. In fact the denominator of (4) together with the matrix G represent all the information in the template, required for finding the affine transformation parameters. Thus the denominator of (4) together with G form a "sufficient representation" of the template (similarly to the notion of sufficient statistics), so that the template itself is not needed for solving the estimation problem once G and the denominator of (4) have been evaluated.

Remark: It should be noted that although we use the term "estimation" throughout this disclosure, the solution in (8) for the affine transformation parameters is exact and is not an estimate in the usual sense of the word.

Remark: The application of a set $\{w_l\}_{l=1}^n$ to g(y) yielding (9) is in fact a mapping from the space of compact support, bounded and measurable functions to the space of n×n matrices. Recall that any n×n matrix can be considered as a vector in $R^{n^2}$. As the set of singular n×n matrices is of measure zero in $R^{n^2}$ (see Lemma 2 in Appendix A) it can be shown that unless g itself is linearly non-informative, i.e., the first order moments of $w_p \circ g$ vanish for any $w_p$ (as is the case in the example below), there will always (in the almost sure sense) exist a set $\{w_l\}_{l=1}^n$ generating a non-singular matrix (9), and hence a solution for the elements of $A^{-1}$. In other words, for any g, which is "rich" enough there will always exist a set $\{w^l\}_{l=1}^n$ generating a non-singular matrix.

Remark: Note that the solution for A employs only zero (the Jacobian) and first order constraints (obtained by multiplying $w_l \circ h$ by $x_k$) and avoids the use of higher order moments. However, imposing such a restriction (which is clearly convenient due to its simplicity) may result in cases where a system of the type (9) does not exist, as illustrated by the following example. It is then obvious that higher order moments are needed to obtain a system similar to (9) (yet nonlinear) with enough equations to solve for all the unknowns.

Example: This example illustrates some of the difficulties and ambiguities of the problem and its solution, and hence the limitations of the proposed method relative to the inherent ambiguities of the problem. Consider the function $$g(x, y) = \begin{cases} 60 & |x|, |y| \le 1; xy \ge 0 \\ 0 & \text{otherwise} \end{cases}$$

The support of the function is depicted in FIG. 2.

In this example we shall restrict ourselves to a subgroup of $GL_2(R)$ where each transformation in this subgroup is an upper triangular invertible matrix i.e., $$Q = \left\{ \begin{pmatrix} a & c \\ 0 & b \end{pmatrix} \middle| |ab| \ne 0 \right\}.$$

Next, consider an embedding of Q in $R^3$ where the coordinate axes are a, b, c (this choice of Q enables us an easy graphical interpretation in the 3-D space). Thus, the condition $ab \ne 0$ implies that Q is all of $R^3$ except the planes $a=0, b=0$ Let $S_g$ denote the set of elements in Q that result in affine symmetry for the given function g (i.e., the set of elements in Q such that g(x,y)=g(ax+cy,by)). Due to the definition of g, only two such symmetry conditions exist: g(x,y)=g(-x,-y) and g(x,y)=g(y,x). However since the transformation g(x,y) =g(y,x) cannot be produced by the assumed group structure, we have that $$S_g = \left\{ \begin{pmatrix} 1 & 0 \\ 0 & 1 \end{pmatrix}, \begin{pmatrix} -1 & 0 \\ 0 & -1 \end{pmatrix} \right\}.$$

Note that for g to have no affine symmetry w.r.t. to the action of Q, the subgroup Q has to be redefined, for example as $$Q = \left\{ \begin{pmatrix} a & c \\ 0 & b \end{pmatrix} \middle| a, b > 0 \right\}.$$

To illustrate the concept and the performance of the proposed method, let us consider the case where the observation is in fact identical to g, i.e., the coordinate transformation between g and the observation h is the identity.

Thus the problem is to find φ, where g and h are given, and it is known that g and h are related through the relation $h = g \circ \phi$, $\phi \in Q$.

Applying the Jacobian condition, (4), we obtain the first constraint the solution for φ must satisfy:

$$\iint_{R^2} h^2(x, y) dx dy = 120 = \iint_{R^2} g^2(x, y) dx dy$$

and hence $$ab = 1. \tag{10}$$

Since for any transformation in Q, x=au+cv and y=vb, application of the first-order-moment constrains, (7), yields (as the Jacobian was found in (10) to be equal to 1):

$$\iint_{R^2} x h(x, y) dx dy = \iint_{R^2} (au + cv) g(u, v) du dv \tag{11}$$

$$= a \iint_{R^2} u g(u, v) du dv + c \iint_{R^2} v g(u, v) du dv$$

$$\iint_{R^2} y h(x, y) dx dy = \iint_{R^2} (bv) g(u, v) du dv$$

$$= b \iint_{R^2} v g(u, v) du dv$$

however $$\iint_{R^2} y h(x, y) dx dy = 0 = \iint_{R^2} v g(u, v) du dv$$

$$\iint_{R^2} x h(x, y) dx dy = 0 = \iint_{R^2} u g(u, v) du dv$$

and hence first-order-moment constraints of the type (7) do not provide any information on the constraints a, b, c must satisfy. Moreover, since g is an even function, the matrix G will always be null, regardless of the chosen composition function $w_i$ (as the $w_i$'s operate on the set of levels the function assumes and not on its support), and therefore the necessary condition in Theorem 1, cannot be satisfied. We therefore conclude that g is linearly non-informative and that higher order moments must be considered. Considering second order moments we have $$\iint_{R^2} x^2 h(x, y) dx dy = \iint_{R^2} (au + cv)^2 g(u, v) du dv$$

$$= a^2 \iint_{R^2} u^2 g(u, v) du dv +$$

$$2ac \iint_{R^2} uv g(u, v) du dv + c^2 \iint_{R^2} v^2 g(u, v) du dv,$$

-continued $$\iint_{R^2} xyh(x,y)dxdy = \iint_{R^2}(au+cv)(bv)g(u,v)dudv$$

$$= ab\iint_{R^2} uvg(u,v)dudv + bc\iint_{R^2} v^2g(u,v)dudv$$

and $$\iint_{R^2} y^2h(x,y)dxdy = \iint_{R^2}(bv)^2g(u,v)dudv$$

$$= b^2\iint_{R^2} v^2g(u,v)dudv$$

where this time we have $$\iint_{R^2} y^2h(x,y)dxdy = 40 = \iint_{R^2} v^2g(u,v)dudv$$

$$\iint_{R^2} x^2h(x,y)dxdy = 40 = \iint_{R^2} u^2g(u,v)dudv$$

$$\iint_{R^2} xyh(x,y)dxdy = 30 = \iint_{R^2} uvg(u,v)dudv$$

Substituting into the above moment equalities we have $40 = b^2 40$ $30 = 30ab + 40bc$ $40 = a^2 40 + 60ac + 40c^2$ which is equivalent to $b = \pm 1$ (12)

$3 = 3ab + 4bc$ (13)

$2 = a^2 2 + 3ac + 2c^2$. (14)

The constraint $b=\pm 1$ describes two planes in $R^3$, the constraint $2=2a^2+3ac+2c^2$ describes a manifold in $R^3$, while each of (10) and (13) describes two manifolds in $R^3$. (See the graphical interpretation of the constraints (12) and (14) in FIG. 3.) It can be easily verified that indeed the only real valued solutions of the system (10)-(14) are given by $a=1$, $b=1, c=0$ and $a=-1, b=-1, c=0$ which is the correct solution, providing the elements of $S_g$.

We have thus described a simple $GL_n(R)$ problem where first order moments are not enough to obtain a solution for the parameters of the deformation, but higher order moments constrain the solution to the inherent ambiguity of the problem. This implies that even for a non-rich function when high-order moments are considered, a solution is achievable.

Remark: Note that in the absence of noise it is possible to generalize the above solution, while keeping it computationally simple, by considering as independent parameters, functions of the model parameters (such as $q_{k1}^2$) that will appear when second- or higher order moments are employed. One can then solve a linear problem expressed in terms of the functions of the problem parameters, thus collecting more information than obtained when only first order moments are employed, for simplicity, in evaluating G.

3. Estimation in the Presence of Model Mismatch

In general, it may happen that there exists a mismatch between the assumed model and the physical one, for example in the presence of noise or when the transformation is not affine but close to it in some sense so that it is desired to best approximate the deformation by an affine transformation. Thus, following the above solution, additional constraints can be added by considering additional compositions $\{w_l\}_{l=1}^P : R \to R$ with $p \geq n$. Thus (3) is replaced by $$\int_{R^n} w_k \circ h(x) \approx \int_{R^n} w_k \circ g(Ax) = |A^{-1}|\int_{R^n} w_k \circ g(y) \quad (15)$$

Thus, (15) produces the overdetermined system $$\begin{pmatrix} \int_{R^n} w_1 \circ h(x) \\ \vdots \\ \int_{R^n} w_p \circ h(x) \end{pmatrix} \approx |A^{-1}| \begin{pmatrix} \int_{R^n} w_1 \circ g(y) \\ \vdots \\ \int_{R^n} w_p \circ g(y) \end{pmatrix} \quad (16)$$

which by a least squares solution provides an estimate for $|A|$. Similarly, (8) is replaced by the overdetermined system $$\begin{pmatrix} \int_{R^n} y_1 w_1 \circ g(y) & \cdots & \int_{R^n} y_n w_1 \circ g(y) \\ \vdots & \ddots & \vdots \\ \int_{R^n} y_1 w_p \circ g(y) & \cdots & \int_{R^n} y_n w_p \circ g(y) \end{pmatrix} \begin{pmatrix} q_{k1} \\ \vdots \\ q_{kn} \end{pmatrix} \approx \begin{pmatrix} |A|\int_{R^n} x_k w_1 \circ h(x) \\ \vdots \\ |A|\int_{R^n} x_k w_p \circ h(x) \end{pmatrix} \quad (17)$$

and the solution for the entries of A becomes a linear LS solution.

Remark: Since the set of singular n×n matrices is of Lebesgue measure zero in $R^{n^2}$, almost every n×n matrix is rank-n. Hence, augmenting the matrix (9) with additional rows by employing p>n constraints yields on the L.H.S. of (17) a matrix which is almost-surely rank-n (unless g itself is linearly non-informative), and hence it can be shown that there will always (in the almost sure sense) exist a least squares solution for the elements of $A^{-1}$. Invoking Lemma 2 again, this time to the estimate of $A^{-1}$, we conclude that almost surely the estimated matrix is non-singular and hence in $GL_n$ (R), as required.

4. Finding the Affine Transformation Parameters in the Presence of Translation

In this section we extend the solution presented in Section 2 by considering the more general problem where the observed object is subject to an affine transformation which includes an unknown translation. In this case the goal is to find the parameters of the affine transformation including the translation. The transformation model is thus given by $y = Ax + c, x = A^{-1}y + b$ (18)

where $x, y, A, A^{-1}$ are defined as in Section 4, while c and $b = -A^{-1}c$ are n-dimensional vectors of unknown constants, each representing the translation along a different axis, in the coordinate transformation model and its inverse, respectively. More specifically let $b = [q_{10}, q_{20}, \ldots, q_{n0}]^T$. Define $y_0 = 1$ and let $\tilde{y} = [y_0, y_1, \ldots, y_n]^T$. Hence, using (18)

$x = T\tilde{y}$ (19)

where T is an n×(n+1) matrix given by $$T = \begin{pmatrix} q_{10} & q_{11} & \cdots & q_{1n} \\ \vdots & & \ddots & \vdots \\ q_{n0} & q_{n1} & \cdots & q_{nn} \end{pmatrix}$$

The Jacobian of the transformation (19) is the same as in the case where there is no translation (analyzed in Section 4) and hence it is found using (3)-(4). The evaluation of T is performed by finding the n+1 elements of each of its n rows by constructing an n+1 dimensional system of linear equations, in a similar way to the procedure in Section 4. More specifically, applying a family of Lebesgue measurable, left-hand compositions $\{w_l\}:R \to R$ to the known relation $h(x)=g(Ax+c)$ and integrating over both sides of the equality, similarly to (5) we obtain $$\int_{R^n} x_k w_l \circ h(x) = |A^{-1}| \int_{R^n} (T_k \tilde{y}) w_l \circ g(\tilde{y}) \qquad (20)$$

$$= |A^{-1}| \sum_{i=0}^{n} q_{ki} \int_{R^n} \tilde{y}_i w_l \circ g(\tilde{y})$$

and in a matrix form, since $g(y)=g(\tilde{y})$, $$\begin{pmatrix} \int_{R^n}(w_1 \circ g(y)) & \int_{R^n} y_1(w_1 \circ g(y)) & \cdots & \int_{R^n} y_n(w_1 \circ g(y)) \\ \vdots & & \ddots & \vdots \\ \int_{R^n}(w_{n+1} \circ g(y)) & \int_{R^n} y_1(w_{n+1} \circ g(y)) & \cdots & \int_{R^n} y_n(w_{n+1} \circ g(y)) \end{pmatrix} \qquad (21)$$

$$\begin{pmatrix} q_{k0} \\ q_{k1} \\ \vdots \\ q_{kn} \end{pmatrix} = \begin{pmatrix} |A| \int_{R^n} x_k(w_1 \circ h(x)) \\ \vdots \\ |A| \int_{R^n} x_k(w_{n+1} \circ h(x)) \end{pmatrix}$$

Similar system of equations is solved for each k to obtain all the elements of T. Hence we have the following:

Theorem 2. Let $A \in GL_n(R)$. Assume $h,g \in M_{Aff}(R^n,R)$ such that $h(x)=g(Ax+c)$. Given measurements of h and g, then A and c can be uniquely determined if there exists a set of Lebesgue measurable functions $\{w_l\}_{l=1}^{n+1}$ such that the matrix $$\begin{pmatrix} \int_{R^n}(w_1 \circ g(y)) & \int_{R^n} y_1(w_1 \circ g(y)) & \cdots & \int_{R^n} y_n(w_1 \circ g(y)) \\ \vdots & & \ddots & \vdots \\ \int_{R^n}(w_{n+1} \circ g(y)) & \int_{R^n} y_1(w_{n+1} \circ g(y)) & \cdots & \int_{R^n} y_n(w_{n+1} \circ g(y)) \end{pmatrix} \qquad (22)$$

is full rank.

Remark: As in the previous case, the elements of the matrix (22) depend only on the template and its coordinate system and thus have to be evaluated only once. Therefore, the denominator of (4) together with the matrix (22) represent all the information in the template, required for finding the affine transformation parameters including the translation. Hence, the denominator of (4) together with the matrix (22) form a sufficient representation of the template.

Remark: We note that in case there exists a translation, i.e., $c \neq 0$, but the translation is considered a nuisance parameter, and hence there is no need to estimate the translation of the observed object relative to the template, the $\{w_i\}$ can be chosen such that $$\int_{R^n} w_i \circ g(x) \equiv 0,$$

which also implies $$\int_{R^n} w_i \circ h(x) \equiv 0.$$

This results in invariance of the solution for A to translations. In this case only n equations are required to estimate the affine transformation, exactly as obtained in Section 2 assuming the translations of both the template and the observation relative to the origin of the coordinate system are zero.

Remark: As in Section 3, if the model is only an approximate one due to model mismatch, (4) and the system (21) are replaced by their corresponding least squares versions obtained by employing a set of compositions $\{w_l\}_{l=1}^{p}:R \to R$ with $p \geq n+1$.

4.1. Discussion

As indicated earlier, for the case where the affine deformation can be assumed small and the observed functions are differentiable, a widely used approach is to linearize the problem using a first order Taylor series expansion.

Because superficially both the solution proposed in this paper and the approximate linearized solution posses similar structures, as they both end-up solving a linear system of equations for the affine transformation parameters, we briefly explain in this subsection the approximate solution and discuss its disadvantages relative to the method proposed here.

Suppose the deformation is small enough so that a first order Taylor series expansion approximates the deformation function well enough, i.e., $h(x,y) \approx g(x+(ax+by+c), y+(dx+ey+f))$, where $(ax+by+c)$ and $(dx+ey+f)$ are small enough such that for g itself $$g(x+(ax+by+c), y+(dx+ey+f)) \cong g(x,y) + (ax+by+c)\frac{\partial g}{\partial x}(x,y) + \qquad (23)$$

$$(dx+ey+f)\frac{\partial g}{\partial y}(x,y)$$

One may next define a cost function between the observation and the approximating deformed template:

$$V(a,b,c,d,e,f) = \sum_{(x,y)} [h(x,y) - g(x+(ax+by+c), \qquad (24)$$

$$y+(dx+ey+f))]^2.$$

Substitution of (23) into (24) yields $$V(a, b, c, d, e, f) = \sum_{(x,y)} \left[ h(x, y) - g(x, y) - (ax + by + c)\frac{\partial g}{\partial x}(x, y) - (dx + ey + f)\frac{\partial g}{\partial y}(x, y) \right]^2$$

Let $$I_x = \frac{\partial g}{\partial x}(x, y), I_y = \frac{\partial g}{\partial y}(x, y), I_d = g(x, y) - h(x, y).$$

Minimizing V(a, b, c, d, e, f) by taking its partial derivatives with respect to the six transformation parameters and equating each result to zero, one obtains $$\frac{\partial V}{\partial a} = \sum 2 \left( h(x, y) - g(x, y) - (ax + by + c)\frac{\partial g}{\partial x}(x, y) - (dx + ey + f)\frac{\partial g}{\partial y}(x, y) \right) x \frac{\partial g}{\partial x}(x, y) = 0 \quad (25)$$

and similarly for the derivatives with respect to the remaining parameters. Reorganization of the six equations of the form (25) results in the following system of linear constraints:

$$\begin{pmatrix} \sum xI_xx_x & \sum yI_xI_x & \sum I_xI_x & \sum xI_yI_x & \sum yI_yI_x & \sum I_yI_x \\ \sum xI_xyI_x & \sum yI_xyI_x & \sum I_xyI_x & \sum xI_yyI_x & \sum yI_yyI_x & \sum I_yyI_x \\ \sum xI_xI_x & \sum yI_xI_x & \sum I_xI_x & \sum xI_yI_x & \sum yI_yI_x & \sum I_yI_x \\ \sum xI_xxI_y & \sum yI_xxI_y & \sum I_xxI_y & \sum xI_yxI_y & \sum yI_yxI_y & \sum I_yxI_y \\ \sum xI_xyI_y & \sum yI_xyI_y & \sum I_xyI_y & \sum xI_yyI_y & \sum yI_yyI_y & \sum I_yyI_y \\ \sum xI_xI_y & \sum yI_xI_y & \sum I_xI_y & \sum xI_yI_y & \sum yI_yI_y & \sum I_yI_y \end{pmatrix} \begin{pmatrix} a \\ b \\ c \\ d \\ e \\ f \end{pmatrix} = \begin{pmatrix} \sum I_dxI_x \\ \sum I_dyI_x \\ \sum I_dI_x \\ \sum I_dxI_y \\ \sum I_dyI_y \\ \sum I_dI_y \end{pmatrix} \quad (26)$$

Provided that the matrix is invertible, a solution for the affine transformation parameters is obtained.

Thus in case the deformation is indeed small, an approximate linear solution to the problem of estimating the affine transformation parameters is formulated. On the other hand, the linear solution proposed in this paper is unique, exact and is applicable to any affine transformation regardless of the magnitude of the deformation. Moreover, while in the presence of noise the new method suggested in this paper allows for an increase in the number of equations which leads to a LS solution for the affine transformation parameters, the linearized approximate solution is based on only six equations, and no additional linear constraints on the parameters can be added to the system. Also note that the linearized approximation requires the evaluation of the image spatial derivatives. This evaluation is highly problematic since the observed objects are usually not continuous nor differentiable everywhere. This restriction becomes even more problematic in the presence of noise. On the other hand, the method derived in this paper employs only integration of the observed data and hence is much more robust.

5. Finding the Affine Transformation Subject to a Spatially Constant Ilumination Gain In the analysis carried out so far it has been assumed that there is no illumination variation between the template and the observation, and hence the observed deformation is only due to the geometric distortion of the coordinate system caused by the affine transformation. In this section we generalize the proposed solution and address the more general deformation model where the model given by (1) is replaced by $$h(x) = ag(Ax+c), A \in GL_n(R), x, c \in R^n, a \in R, a > 0 \quad (27)$$

where a, A and c are unknown and need to be determined. As we prove in this section, the problem of finding the constant illumination gain amounts to replacing the step in which the Jacobian of the transformation is being determined in the case where there is no illumination change between the observation and the template, by a step in which both the illumination gain and the Jacobian are jointly determined. More specifically, since h(x)=ag(Ax+c), we have $$\int_{R^n} h^2(x) = a^2 \int_{R^n} |A^{-1}| g^2(y) = a^2 |A^{-1}| \int_{R^n} g^2(y) \quad (28)$$

Similarly, $$\int_{R^n} h^4(x) = a^4 |A^{-1}| \int_{R^n} g^4(y) \qquad (29)$$

Hence, $$|A^{-1}|a^2 = \frac{\int_{R^n} h^2(x)}{\int_{R^n} g^2(y)} \qquad (30)$$

and $$|A^{-1}|a^4 = \frac{\int_{R^n} h^4(x)}{\int_{R^n} g^4(y)} \qquad (31)$$

Thus, both the Jacobian, $|A^{-1}|$, and the illumination gain, a, can be evaluated using (30)-(31). In the second stage n linear and independent constraints on the type (7) (or n+1 linear and independent constraints of the type (20), if translation is to be estimated) on the elements of the inverse transformation matrix must be set. For generality, we consider the case where translation is estimated as well. Applying a family of Lebesgue measurable, left-hand compositions $\{w_l\}:R \to R$ to the known relation $1/ah(x)=g(Ax+c)$ and integrating over both sides of the equality, similarly to (20) we obtain $$\int_{R^n} x_k w_l \circ \left(\frac{h(x)}{a}\right) = \qquad (32)$$

$$|A^{-1}| \int_{R^n} (T_k \tilde{y}) w_l \circ g(\tilde{y}) - |A^{-1}| \sum_{i=0}^{n} q_{ki} \int_{R^n} \tilde{y}_i w_l circ g(\tilde{y})$$

and in a matrix form, since $g(y)=g(\tilde{y})$, $$\begin{pmatrix} \int_{R^n} (w_1 \circ g(y)) & \int_{R^n} y_1(w_1 \circ g(y)) & \cdots & \int_{R^n} y_n(w_1 \circ g(y)) \\ \vdots & & \ddots & \vdots \\ \int_{R^n} (w_{n+1} \circ g(y)) & \int_{R^n} y_1(w_{n+1} \circ g(y)) & \cdots & \int_{R^n} y_n(w_{n+1} \circ g(y)) \end{pmatrix} \qquad (33)$$

$$\begin{pmatrix} q_{k0} \\ q_{k1} \\ \vdots \\ q_{kn} \end{pmatrix} = \begin{pmatrix} |A| \int_{R^n} x_k \left( w_1 \circ \frac{h(x)}{a} \right) \\ \vdots \\ |A| \int_{R^n} x_k \left( w_{n+1} \circ \frac{h(x)}{a} \right) \end{pmatrix}$$

Thus, once the illumination gain and the Jacobian have been evaluated, the R.H.S. of (33) is known, and the solution for the elements of the k th row of T is obtained. Hence we have, Theorem 3. Let $A \in GL_n(R)$. Assume $h, g \in M_{Aff}(R^n, R)$ such that $h(x)=ag(Ax+c)$, and a is an unknown real gain coefficient. Given measurements of h and g, then A, c and a can be uniquely determined if there exists a set of Lebesgue measurable functions $\{w_l\}_{l=1}^{n+1}$ such that the matrix (22) is full rank.

Remark: Similarly to the previous cases, where illumination is assumed fixed, the denominators of (30) and (31), as well as the elements of the matrix (22) depend only on the template and its coordinate system and thus have to be evaluated only once. Therefore, the denominators of (30), (31) together with the matrix (22) represent all the information in the template, required for finding the affine transformation parameters including the translation, in the case where the illumination gain is unknown. Hence, the denominators of (30) and (31) together with the matrix (22) form a sufficient representation of the template.

Remark: As in Section 5, if the model is only an approximate one due to model mismatch, the system (30)-(31) as well as the system (33) are replaced by their corresponding least squares versions obtained by employing a set of compositions $\{w_l\}_{l=1}^{p}:R \to R$ with $p \geq n+1$.

6. The Algorithmic Solution for a Time Dependent Evolution

In this section we extend the derivation in the previous sections to the case where the affine transformation changes with time, while the given template $g(\cdot)$ is fixed in time. The set of observations in this case is the time sequence h(x,t). Thus, the problem statement is as follows: Let $A(t) \in GL_n(R)$ for every t. Assume that $g \in M_{Aff}(R^n, R)$ and that for every t, $h(t) \in M_{Aff}(R^n, R)$ such that $$h(x,t)=g(A(t)x) \qquad (34)$$

Thus, given h(t) and g, find A(t).

Let $\{e_i(t):R \to R\}$ be a set of linearly independent functions in $L_2(R)$ (e.g., polynomials, trigonometric functions). Assume that the time dependence of $A^{-1}$ is parameterized as $$A^{-1}(t) = \begin{pmatrix} \sum_{i=1}^{L} a_{11}^i e_i(t) & \cdots & \sum_{i=1}^{L} a_{1n}^i e_i(t) \\ \vdots & \ddots & \vdots \\ \sum_{i=1}^{L} a_{n1}^i e_i(t) & \cdots & \sum_{i=1}^{L} a_{nn}^i e_i(t) \end{pmatrix} = \qquad (35)$$

$$\sum_{i=1}^{L} \begin{pmatrix} a_{11}^i & \cdots & a_{1n}^i \\ \vdots & \ddots & \vdots \\ a_{n1}^i & \cdots & a_{nn}^i \end{pmatrix} e_i(t) \quad t \in R$$

The problem then is to determine the above sequence of L matrices.

Define the following n-dimensional product $e_{i_1}(t)e_{i_2}(t) \ldots e_{i_n}(t)$ where the indices $i_1, i_2, \ldots, i_n \in \{1, \ldots, L\}$ and let $$\{e_{i_1}(t)e_{i_2}(t) \ldots e_{i_n}(t)\}_{i_1, i_2, \ldots, i_n=1}$$

be the set of all such products. Clearly there are at most LU different elements in this set. Let Q be the number of linearly independent element in this set. To simplify the notation we shall refer to this set using the notation $\{f_k(t)\}_{k=1}^{Q}$. By definition, the determinant of $A^{-1}(t)$ in (35) has the form $$|A^{-1}|(t) = \sum_{k=1}^{Q} d_k f_k(t) \qquad (36)$$

Extending the previous derivations to the time varying case we have $$\int_{R^n} w_p \circ h(x, t) = \int_{R^n} w_p \circ g(A(t)x) = |A^{-1}|(t) \int_{R^n} w_p \circ g(y) \qquad (37)$$

Substituting (36) into (37) we have $$\int_{R^n} w_p \circ h(x, t) = \sum_{k=1}^{Q} d_k f_k(t) \int_{R^n} w_p \circ g(y) \qquad (38)$$

Let $[t_1, \ldots, t_v]^T$ denote the vector of time samples and let $\{w^i\}_{i=1}^{P}$ be the sequence of chosen left-compositions. Then, $$\begin{pmatrix} \int_{R^n} w_1 \circ h(x, t_1) \\ \vdots \\ \int_{R^n} w_1 \circ h(x, t_v) \\ \int_{R^n} w_2 \circ h(x, t_1) \\ \vdots \\ \int_{R^n} w_2 \circ h(x, t_v) \\ \vdots \\ \int_{R^n} w_P \circ h(x, t_v) \end{pmatrix} = \begin{pmatrix} f_1(t_1) \int_{R^n} w_1 \circ g(y) & f_2(t_1) \int_{R^n} w_1 \circ g(y) & \ldots & f_Q(t_1) \int_{R^n} w_1 \circ g(y) \\ \vdots & & & \vdots \\ f_1(t_v) \int_{R^n} w_1 \circ g(y) & f_2(t_v) \int_{R^n} w_1 \circ g(y) & \ldots & f_Q(t_v) \int_{R^n} w_1 \circ g(y) \\ f_1(t_1) \int_{R^n} w_2 \circ g(y) & & & f_Q(t_1) \int_{R^n} w_2 \circ g(y) \\ \vdots & & \ldots & \vdots \\ f_1(t_v) \int_{R^n} w_2 \circ g(y) & f_2(t_v) \int_{R^n} w_2 \circ g(y) & \ldots & f_Q(t_v) \int_{R^n} w_2 \circ g(y) \\ \vdots & & & \vdots \\ f_1(t_v) \int_{R^n} w_P \circ g(y) & f_2(t_v) \int_{R^n} w_P \circ g(y) & \ldots & f_Q(t_v) \int_{R^n} w_P \circ g(y) \end{pmatrix} \begin{pmatrix} d_1 \\ d_2 \\ \vdots \\ d_Q \end{pmatrix} \qquad (39)$$

By choosing the $\{w_i\}_{i=1}^{P}$ such that at least Q rows of this matrix are linearly independent $|A|(t)$ is found by a LS solution. Clearly, if the model is accurate only P=Q equations are required.

Having obtained the Jacobian of the transformation we next determine the entries of $A^{-1}(t)$ for each of its rows and for all $t \in \{t_1, \ldots, t_v\}$.

$$\int_{R^n} x_k w_p \circ h(x, t) = \int_{R^n} x_k w_p \circ g(A(t)x) \qquad (40)$$

$$= |A^{-1}(t)| \int_{R^n} (((A^{-1}(t))_k y) w_p \circ g(y))$$

$$= |A^{-1}(t)| \int_{R^n} \left( \left[ \sum_{j=1}^{n} \left( \sum_{i=1}^{L} a_{kj}^i e_i(t) \right) y_j \right] w_p \circ g(y) \right)$$

$$= \sum_{j=1}^{n} \left( |A^{-1}(t)| \left( \sum_{i=1}^{L} a_{kj}^i e_i(t) \right) \int_{R^n} y_j w_p \circ g(y) \right)$$

-continued $$= \sum_{i=1}^{L} \sum_{j=1}^{n} a_{kj}^i \left( e_i(t) |A^{-1}(t)| \int_{R^n} y_j w_p \circ g(y) \right)$$

which yields when expressed in a matrix form $$\begin{pmatrix} \int_{R^n} x_k w_1 \circ h(x, t_1) \\ \int_{R^n} x_k w_1 \circ h(x, t_2) \\ \vdots \\ \int_{R^n} x_k w_1 \circ h(x, t_v) \\ \int_{R^n} x_k w_2 \circ h(x, t_1) \\ \vdots \\ \int_{R^n} x_k w_P \circ h(x, t_v) \end{pmatrix} = [G_t^1, G_t^2, \ldots, G_t^L] \begin{pmatrix} a_{k1}^1 \\ a_{k2}^1 \\ \vdots \\ a_{kn}^1 \\ a_{kn}^2 \\ \vdots \\ a_{kn}^L \end{pmatrix} \qquad (41)$$

$$G_t^i = \begin{pmatrix} e_i(t_1)|A^{-1}|(t_1) \left( \int_{R^n} y_1 w_1 \circ g(y) \right) & \ldots & e_i(t_1)|A^{-1}|(t_1) \left( \int_{R^n} y_n w_1 \circ g(y) \right) \\ e_i(t_2)|A^{-1}|(t_2) \left( \int_{R^n} y_1 w_1 \circ g(y) \right) & \ldots & e_i(t_2)|A^{-1}|(t_2) \left( \int_{R^n} y_n w_1 \circ g(y) \right) \\ \vdots & \ddots & \vdots \\ e_i(t_v)|A^{-1}|(t_v) \left( \int_{R^n} y_1 w_P \circ g(y) \right) & \ldots & e_i(t_v)|A^{-1}|(t_v) \left( \int_{R^n} y_n w_P \circ g(y) \right) \end{pmatrix} \qquad (42)$$

Hence,

Theorem 4. Let $A(t) \in GL_n(R)$ for every t. Assume that for every t, $h(t), g \in M_{Aff}(R^n, R)$ such that $h(x)=g(A(t)x)$. Then given measurements of $h(t)$ and $g$, $A(t)$ can be uniquely determined if there exists a set of measurable functions $\{w_l\}_{l=1}^P$ such that the matrix $$[G_t^1, G_t^2, \ldots, G_t^L] \quad (43)$$

is full rank.

7. Observations Subject to Additive Noise: The Least Squares Solution

In the presence of noise the observed data is given by $$h(x) = g(Ax) + \eta(x). \quad (44)$$

Assume that the noise is stationary, zero mean and uncorrelated such that its higher order moments are known, where we adopt the notation $\sigma_k = E[\eta^k(x)]$. We first address questions related to the issue of the optimal choice of the set $\{w_p\}$ for each template function g. We begin by adapting the solution derived in the previous sections for the deterministic case, to a least squares solution for the model parameters. In the presence of noise the basic equation (7) becomes $$\int_{R^n} x_k w_p \circ h(x) = \int_{R^n} x_k w_p \circ [g(Ax) + \eta(x)] \quad (45)$$

Let $\in_{p,k}^g$ denote the error term in each equation due to the presence of the noise, i.e., $$\varepsilon_{p,k}^g = \int_{R^n} x_k \{w_p \circ [g(Ax) + \eta(x)] - w_p \circ g(Ax)\} \quad (46)$$

Following a similar procedure to the one developed in the previous sections, we obtain the linear system of equations $$\int_{R^n} x_k w_p \circ h(x) = |A^{-1}| \int_{R^n} ((A^{-1})_k y) w_p \circ g(y) + \varepsilon_{p,k}^g \quad (47)$$

$$= |A^{-1}| \sum_{i=1}^n q_{ki} \int_{R^n} y_i w_p \circ g(y) +$$

$$\varepsilon_{p,k}^g \, p = 1, \ldots, P$$

The system (47) represents a linear regression problem where the noise sequence $\{\in_{p,k}^g\}$ is, in general, non-stationary since its statistics depend on the choice of $w_p$ for each p. The regressors are functions of $w_p$ and the template g, and hence are deterministic. Provided that the sequence of composition functions $\{W_p\}_{p=1}^P$ is chosen such that the resulting regressors matrix is full rank, the system (47) is solved by a linear least squares method such that the $l_2$ norm of the noise vector is minimized, exactly as in (17), while $|A^{-1}|$ is evaluated using (16).

The dependence of the noise sequence $\{\in_{p,k}^g\}$ on the choice of $w_p$ suggests that different choices of the composition sequence $\{w_p\}_{p=1}^P$ may provide different solutions. We shall be first interested in systems such that for each p, the linear constraint imposed by $w_p$ is such that the "effective noise" that corresponds to each $w_p$ is zero mean.

7.1. Construction of Linear Constraints with Zero-Mean Error Terms

Consider the case where we choose $w_p(x) = \Sigma_k \alpha_k^p x^k$. We next evaluate the mean term of the Jacobian and the mean term of each of the linear constraints, (47), on the entries of $A^{-1}$. Thus, correction terms can be introduced such that the non-zero-mean error terms are replaced by zero mean error terms. To simplify the notation we will take advantage of the linear structure of $w_p(x)$, and analyze only the case where $w^p(x) = x^p$ and the generalization is straightforward. Thus, in this case $$\int_{R^n} h^p(x) = \int_{R^n} (g(Ax) + \eta(x))^p \quad (48)$$

$$= \int_{R^n} \sum_{i=0}^p \binom{p(84)}{i(85)} g^i(Ax)(\eta(x))^{p-i}$$

$$= |A^{-1}| \sum_{i=0}^p \binom{p(86)}{i(87)} \int_{R^n} g^i(y)(\eta(A^{-1}(y)))^{p-i}$$

Evaluating the expected values of both sides of (88) we have $$E\left[\int_{R^n} h^p(x)\right] = E\left[|A^{-1}| \sum_{i=0}^p \binom{p}{i} \int_{R^n} (g^i(y)(\eta(A^{-1}(y)))^{p-i})\right] \quad (49)$$

$$= |A^{-1}| \sum_{i=0}^p \binom{p}{i} \int_{R^n} g^i(y) \sigma_{p-i}$$

$$= |A^{-1}| \int_{R^n} g^p(y) + |A^{-1}| \sum_{i=0}^{p-1} \binom{p}{i} \int_{R^n} g^i(y) \sigma_{p-i}$$

where the first term in the sum is precisely the term obtained in the absence of noise and with $w_p(x) = x^p$, while $$|A^{-1}| \sum_{i=0}^{p-1} \binom{p}{i} \int_{R^n} g^i(y) \sigma_{p-i}$$

is an added mean term due to the noise contribution.

Let $\in_p^{J,g}$ denote the error term in the Jacobian constraint equation, due to the presence of the noise for the choice $w_p(x) = x^p$, i.e., $$\varepsilon_p^{J,g} = \int_{R^n} \{[g(Ax) + \eta(x)]^p - g^p(Ax)\} \quad (50)$$

$$= |A^{-1}| \sum_{i=0}^{p-1} \binom{p}{i} \int_{R^n} g^i(y) \sigma_{p-i} + \tilde{\varepsilon}_p^{J,g}$$

where $\in_p^{J,g}$ is a zero mean random variable. We can therefore rewrite (48) as $$\int_{R^n} h^p(x) = |A^{-1}| \left( \int_{R^n} g^p(y) + \sum_{i=0}^{p-1} \binom{p}{i} \int_{R^n} g^i(y) \sigma_{p-i} \right) + \tilde{\varepsilon}_p^{J,g} \quad (51)$$

The system (101) represents a linear regression problem in $|A^{-1}|$ where the observation noise is zero mean. The regressors are functions of $w_p$, the template g, and the known statistics of the noise. Hence the regressors are deterministic. The system (101) is solved by a linear least squares method such that $\Sigma_{p=1}^P |\varepsilon_p^{J,g}|^2$ is minimized.

Following a similar procedure we next obtain zero-mean linear constraints on the entries of $A^{-1}$:

$$\int_{R^n} x_k h^p(x) = \int_{R^n} x_k (g(Ax) + \eta(x))^p \quad (52)$$

$$= \int_{R^n} x_k \sum_{i=0}^{p} \binom{p}{i} g^i(Ax)(\eta(x))^{p-i}$$

$$= \int_{R^n} |A^{-1}| \left( \sum_{j=1}^{n} q_{kj} y_j \right) \sum_{i=0}^{p} \binom{p}{i} g^i(y)(\eta(A^{-1}(y)))^{p-i}$$

$$= |A^{-1}| \sum_{j=1}^{n} q_{kj} \left( \sum_{i=0}^{p} \binom{p}{i} \left( \int_{R^n} y_j (g^i(y)(\eta(A^{-1}(y)))^{p-i}) \right) \right)$$

Evaluating the expected values of both sides of (52) we have $$E\left[ \int_{R^n} x_k h^p(x) \right] = E\left[ |A^{-1}| \sum_{j=1}^{n} q_{kj} \left( \sum_{i=0}^{p} \binom{p}{i} \left( \int_{R^n} y_j (g^i(y)(\eta(A^{-1}(y)))^{p-i}) \right) \right) \right] \quad (53)$$

$$= |A^{-1}| \sum_{j=1}^{n} q_{kj} \left( \sum_{i=0}^{p} \binom{p}{i} \int_{R^n} y_j g^i(y) \sigma_{p-i} \right)$$

$$= |A^{-1}| \sum_{j=1}^{n} q_{kj} \int_{R^n} y_j g^p(y) + |A^{-1}| \sum_{j=1}^{n} q_{kj} \left( \sum_{i=0}^{p-1} \binom{p}{i} \int_{R^n} y_j g^i(y) \sigma_{p-i} \right)$$

where the first term in the sum is precisely the term on the R.H.S. of (7) obtained in the absence of noise and with $w_p(x) = x^p$, while $$|A^{-1}| \sum_{j=1}^{n} q_{kj} \left( \sum_{i=0}^{p-1} \binom{p}{i} \int_{R^n} y_j g^i(y) \sigma_{p-i} \right)$$

is an added mean term due to the noise contribution.

Hence for the choice of $w_p(x) = x^p$, $\varepsilon_{p,k}^g$ defined in (46) has the form $$\varepsilon_{p,k}^g = \int_{R^n} x_k \{ [g(Ax) + \eta(x)]^p - g^p(Ax) \} \quad (54)$$

-continued $$= |A^{-1}| \sum_{j=1}^{n} q_{kj} \left( \sum_{i=0}^{p-1} \binom{p}{i} \int_{R^n} y_j g^i(y) \sigma_{p-i} \right) + \tilde{\varepsilon}_{p,k}^g$$

where the last equality is due to (7) and (52), while $\varepsilon_{p,k}^g$ is a zero mean random variable. Thus, (52) can be written in the form $$\int_{R^n} x_k h^p(x) = \quad (55)$$

$$|A^{-1}| \sum_{j=1}^{n} q_{kj} \left\{ \int_{R^n} y_j g^p(y) + \sum_{i=0}^{p-1} \binom{p}{i} \int_{R^n} y_j g^i(y) \sigma_{p-i} \right\} + \tilde{\varepsilon}_{p,k}^g$$

Thus the system (55) represents a linear regression problem, different from (47), where the observation noise is non-stationary, but with a zero mean. The regressors are functions of $w_p$, the template g, and the known statistics of the noise. Hence the regressors are deterministic. Provided that the resulting regressors matrix is full rank, the system (55) is solved by a linear least squares method such that $\Sigma_{p=1}^P |\varepsilon_{p,k}^g|^2$ is minimized.

It should be noted however that the noise sequence $\varepsilon_{p,k}^g$ is only approximately zero-mean, since in (53) it is assumed that $|A^{-1}|$ is a deterministic constant. However, in the estimation procedure itself it is replaced by its estimate obtained from solving (51), which is a function of the noise sequence $\eta(x)$.

8. Analysis of the High SNR Case

In this section we analyze the proposed method assuming that the signal to noise ratio is high. Let $\sigma^2$ denote the noise variance. In the following we restrict our attention to continuous and differentiable (at least twice) composition functions $w_p(x): R \to R$. Expanding $w_p \circ h(x)$ into a Taylor series about $g(Ax)$, and employing the high SNR assumption to neglect the contribution of high noise powers we have $$w_p \circ h(x) \approx w_p \circ g(Ax) + \eta(x) w'_p \circ g(Ax) \quad (56)$$

where $$w'_p(x) = \frac{dw_p(x)}{dx}.$$ (5)

Hence, the error term in the "moment" equation, (46), is approximated under the high SNR assumption by $$\tilde{\varepsilon}^g_{p,k} = \int_{R^n} x_k \eta(x) w'_p \circ g(Ax) \, p = 1, \ldots, P$$ (57)

Clearly, $E[\overline{\varepsilon}_p^g]=0$, $p=1, \ldots, P$. We next evaluate the error covariances of the system, under the high SNR assumption. Let $\in_k^g=[\overline{\varepsilon}_{1,k}^g, \ldots, \overline{\varepsilon}_{P,k}^g]^T$, $\in^g=[(\in_1^g)^T, \ldots, (\in_n^g)^T]^T$ and $\Gamma=E[\in^g(\in^g)^T]$. Thus, the (r,s) element of the P×P dimensional, (k,l) block of $\Gamma$, denoted $\Gamma^{k,l}$ is given by $$\Gamma^{k,l}(r,s) = E\left[\int_{R^n} x_k \eta(x) w'_r \circ g(Ax) \int_{R^n} z_l \eta(z) w'_s \circ g(Az)\right]$$ (58)

$$= \sigma^2 \int_{R^n} x_k x_l w'_r \circ g(Ax) w'_s \circ g(Ax)$$

$$= \sigma^2 |A^{-1}| \int_{R^n} [(A^{-1})_k y][(A^{-1})_l y] w'_r \circ g(y) w'_s \circ g(y)$$

$$= \sigma^2 |A^{-1}| \sum_{i=1}^{n} \sum_{j=1}^{n} q_{ki} q_{lj} \int_{R^n} y_i y_j w'_r \circ g(y) w'_s \circ g(y)$$

Rewriting (58) in matrix form we have $$\Gamma^{k,l} = \sigma^2 |A^{-1}| \sum_{i=1}^{n} \sum_{j=1}^{n} q_{ki} q_{lj} u_{i,j} \text{ where}$$ (59)

$$u_{i,j} = \begin{pmatrix} \int_{R^n}\int_{R^n} y_i y_j w'_1 \circ g(y) w'_1 \circ g(y) & \cdots & \int_{R^n} y_i y_j w'_1 \circ g(y) w'_P \circ g(y) \\ \vdots & \ddots & \vdots \\ \int_{R^n} y_i y_j w'_P \circ g(y) w'_1 \circ g(y) & \cdots & \int_{R^n} y_i y_j w'_P \circ g(y) w'_P \circ g(y) \end{pmatrix}$$ (60)

EXAMPLE

Consider the case where $w_p(x)=x^p$. In this case $$h^p(x) \approx g^p(Ax) + p\eta(x)g^{p-1}(Ax)$$ (61)

and the error term in the "moment" equation, (57) becomes $$\tilde{\varepsilon}^g_{p,k} = p \int_{R^n} x_k \eta(x) g^{p-1}(Ax) \, p = 1, \ldots, P$$ (62)

The (r,s) element of the P×P dimensional, (k,l) block of $\Gamma$, denoted $\Gamma^{k,l}$ is given by $$\Gamma^{k,l}(r,s) = rsE\left[\int_{R^n} x_k \eta(x) g^{r-1}(Ax) \int_{R^n} z_l \eta(z) g^{s-1}(Az)\right]$$ (63)

$$= \sigma^2 rs \int_{R^n} x_k x_l g^{r+s-2}(Ax)$$

$$= \sigma^2 rs |A^{-1}| \int_{R^n} [(A^{-1})_k y][(A^{-1})_l y] g^{r+s-2}(y)$$

$$= \sigma^2 rs |A^{-1}| \sum_{i=1}^{n} \sum_{j=1}^{n} q_{ki} q_{lj} \int_{R^n} y_i y_j g^{r+s-2}(y)$$

and (60) becomes in this special case $$u_{i,j} = \begin{pmatrix} \int_{R^n} y_i y_j 1_{supp(g(y))} & 2\int_{R^n} y_i y_j g(y) & \cdots & P\int_{R^n} y_i y_j g^{P-1}(y) \\ \vdots & & \ddots & \vdots \\ P\int_{R^n} y_i y_j g^{P-1}(y) & 2P\int_{R^n} y_i y_j g^P(y) & \cdots & P^2 \int_{R^n} y_i y_j g^{2P-2}(y) \end{pmatrix}$$ (64)

9. Maximum Likelihood Estimation of the Affine Transformation Parameters

As we demonstrate in the next section, the LS algorithm for estimating the affine transformation parameters is accurate and computationally simple as it requires only the solution of a set of linear equations. In particular there is no need for an iterative solution. Nevertheless, in cases where the performance of this algorithm is not sufficient, it can serve to initialize the more complex maximum likelihood estimator (MLE) of the parameters, which we derive in this section.

Assuming the observation noise $\eta(x)$ is Gaussian, we have under the high SNR assumption that $\in^g$ is a zero mean Gaussian random vector with covariance matrix $\Gamma$ whose blocks are given in (59). Substituting (56) and (57) into (47) and rewriting it in a in a matrix form, we have under the high SNR assumption that $$\begin{pmatrix} \int_{R^n} x_k w_1 \circ h(x) \\ \vdots \\ \int_{R^n} x_k w_P \circ (x) \end{pmatrix} =$$ (65)

$$|A^{-1}| \begin{pmatrix} \int_{R^n} y_1 w_1 \circ g(y) & \cdots & \int_{R^n} y_n w_1 \circ g(y) \\ \vdots & \ddots & \vdots \\ \int_{R^n} y_1 w_P \circ g(y) & \cdots & \int_{R^n} y_n w_P \circ g(y) \end{pmatrix} \begin{pmatrix} q_{k1} \\ \vdots \\ q_{kn} \end{pmatrix} + \begin{pmatrix} \tilde{\varepsilon}^g_{1,k} \\ \vdots \\ \tilde{\varepsilon}^g_{P,k} \end{pmatrix}$$

Rewriting (65) using matrix notations we have $$h_k = |A^{-1}| D q_k + \in_k^g.$$ (66)

Let $\overline{h}=[h_1^T, h_2^T, \ldots, h_n^T]^T$, $q=[q_1^T, q_2^T, \ldots, q_n^T]^T$, and $\overline{D}=I_n \otimes D$, where $I_n$ is an n×n identity matrix. Hence the log-likelihood function for the observation vector $\overline{h}$ is given by $$\log p(\overline{h}; q) = -\frac{m}{2}\log(2\pi) - \frac{1}{2}\log(|\Gamma|) -$$ (67)

$$\frac{1}{2}(\overline{h} - |A^{-1}|\overline{D}q)^T \Gamma^{-1}(\overline{h} - |A^{-1}|\overline{D}q)$$

The MLE of the affine transformation parameters is found by maximizing log p($\overline{h}$;q) with respect to the model parameters $\{q_{i,j}\}$. Since this objective function is highly nonlinear in the problem parameters, the maximization problem cannot be solved analytically and we must resort to numerical methods. In order to avoid the enormous computational burden of an exhaustive search, we use the following two-step procedure. In the first stage we obtain a suboptimal initial estimate for the parameter vector q by using the algorithm described in Section 7. In the second stage we refine these initial estimates by an iterative numerical maximization of the log likelihood function. In our experiments we use the Broyden-Fletcher-Goldfarb-Shanno (BFGS) quasi-Newton optimization method. This algorithm requires evaluation of the first derivative of the objective function at each iteration:

$$\frac{\partial \log p(\overline{h}; q)}{\partial q_{k,l}} = -\frac{1}{2} tr \left\{ \Gamma^{-1} \frac{\partial \Gamma}{\partial q_{k,l}} \right\} + \quad (68)$$

$$\frac{\partial (|A^{-1}|\overline{D}q)^T}{\partial q_{k,l}} \Gamma^{-1}(\overline{h} - |A^{-1}|\overline{D}q) +$$

$$\frac{1}{2}(\overline{h} - |A^{-1}|\overline{D}q)^T \Gamma^{-1} \frac{\partial \Gamma}{\partial q_{k,l}} \Gamma^{-1}(\overline{h} - |A^{-1}|\overline{D}q)^T$$

such that $$\frac{\partial (|A^{-1}|\overline{D}q)}{\partial q_{k,l}} = \frac{\partial |A^{-1}|}{\partial q_{k,l}} \overline{D}q + |A^{-1}|\overline{D}_{(k-1)n+l} \quad (69)$$

$$= (-1)^{k+l} M_{k,l} \overline{D}q + |A^{-1}|\overline{D}_{(k-1)n+l}$$

where $M_{k,l}$ is the (k,l) minor of $A^{-1}$ and $\overline{D}_l$ denotes the l-th column of $\overline{D}$. Finally, $$\frac{\partial \Gamma^{s,t}}{\partial q_{k,l}} = (-1)^{k+l}|A|M_{k,l}\Gamma^{s,t} + \quad (70)$$

$$\sigma^2 |A^{-1}| \begin{cases} \sum_{j=1}^{n} q_{t,j} u_{l,j} & s \neq t, s = k \\ \sum_{i=1}^{n} q_{s,i} u_{i,l} & s \neq t, t = k \\ 2\sum_{i=1}^{n} q_{k,i} u_{l,i} & s = t = k \\ 0_{P \times P} & \text{otherwise} \end{cases}$$

where we have used the property that $u_{i,j} = u_{j,i}$. Substitution of (70) and (69) into (68) provides an expression for the derivative of the log-likelihood function in terms of the parameters of the inverse affine transformation.

10. Numerical Examples

In this section we present some numerical examples to illustrate the operation and robust performance of the proposed parameter estimation algorithm, for a broad range of affine deformations.

The examples illustrates the operation of the proposed algorithm on a car image. The template image dimensions are 3100×1200. It is shown in the bottom image of FIG. 4. The observed deformed image is shown in the upper image of the figure. The image coordinate system is [−1,1]×[−1,1]. The translation vector is [−0.1,−0.14] and the translation estimation error vector is [2·10$^{-5}$,2.4·10$^{-4}$]. The deforming transformation is given by $$A = \begin{pmatrix} -0.988 & 0.454 \\ 0.156 & -0.891 \end{pmatrix}$$

where the estimate obtained by the proposed procedure is $$\hat{A} = \begin{pmatrix} -0.987 & 0.453 \\ 0.156 & -0.891 \end{pmatrix}.$$

To provide some measure for the magnitude of the error in estimating the deformation matrix we list the value of $A^{-1}\hat{A} - I$:

$$A^{-1}\hat{A} - I = \begin{pmatrix} 9.943 & -2.301 \\ -1.298 & 0.228 \end{pmatrix} \cdot 10^{-4}$$

Finally, the estimated deformation is applied to the original template in order to obtain an estimate of the deformed object (middle image in FIG. 4) which can be compared with the deformed observation shown in the upper image.

The second example employs the same template as the first one and it is shown in the bottom image in FIG. 5. The observed deformed image is shown in the upper image of the figure. This image is both smaller in scale than in the first example and is observed with lower illumination, such that the illumination gain is a=0.58. The error in estimating the gain is à−a=0.726·10$^{-7}$. The image coordinate system is [−1, 1]×[−1,1]. The translation vector is [−0.4,−0.5] and the translation estimation error vector is [1.85·10$^{-3}$,3.92·10$^{-5}$]. The deforming transformation is given by $$A = \begin{pmatrix} 0.4854 & 0.3527 \\ -0.3527 & 0.4854 \end{pmatrix}$$

where the estimate obtained by the proposed procedure is $$\hat{A} = \begin{pmatrix} 0.4722 & 0.3626 \\ -0.353 & 0.4858 \end{pmatrix},$$

while $$A^{-1}\hat{A} - I = \begin{pmatrix} 0.81 & -2.65 \\ 0.001 & -0.11 \end{pmatrix} \cdot 10^{-2}$$

Finally, the estimated deformation is applied to the original template in order to obtain an estimate of the deformed object (middle image in FIG. 5) which can be compared with the deformed observation shown in the upper image.

Part B: Estimation of Multi-Dimensional Homeomorphisms for Object Recognition in Noisy Environments 1. Introduction This section is concerned with the general problem of automatic object recognition based on a set of known templates, where the deformations are differentiable homeomorphisms having a continuous and differentiable inverse, such that the derivative of the inverse is also continuous.

The center of the proposed solution is a method that reduces the high dimensional problem of evaluating the orbit created by applying the set of all possible homeomorphic transformations in the group to the template, into a problem of analyzing a function in a low dimensional Euclidian space. In general, an explicit modeling of the homeomorphisms group is impossible. We therefore choose to solve this problem by focusing on subsets of the homeomorphisms group which are also subsets of vector spaces. This may be regarded as an approximation the homeomorphism using polynomials, based on the denseness of the polynomials in the space of continuous functions with compact support. In this setting, the problem of estimating the parametric model of the deformation is solved by a linear system of equations in the low dimensional Euclidian space.

More specifically, consider the problem given by $h(x_1, \ldots, x_n) = g(\phi(x_1, \ldots, x_n))$ where $\phi(x_1, \ldots, x_n) = (\phi(x_1, \ldots, x_n), \ldots, \phi_n(x_1, \ldots, x_n))$. In the problem setting considered here h and g are given while $\phi$ should be estimated. We next summarize the algorithmic solution for the problem of estimating the homeomorphic deformation in the absence of observation noise. To simplify the notation and the accompanying discussion we present the solution for the case where the observed signals are one-dimensional. The derivation for higher dimensions follows along similar lines.

2. Parametric Modeling and Estimation Homeomorphisms with a Differentiable and Continuous Inverse Let R be the one-dimensional Euclidean space, and let the corresponding measure be the standard Lebesgue measure. Consider the general case where $h: X \to Y$ and $g: X \to Y$ are bounded and measurable functions with compact support $X \subset R$, and where $Y \subset R$, such that $$h(x) = g(\phi(x)). \tag{71}$$

In the following we assume that G is the group of differentiable homeomorphisms such that each element of G has a continuous and differentiable inverse, where the derivative of the inverse is also continuous. Let C(X) denote the set of continuous real-valued functions of X onto itself, where the norm is the standard $L_2$ norm. By the above assumption every $\phi^{-1}, (\phi^{-1})' \in C(X)$. Since C(X) is a normed separable space, there exists a countable set of basis functions $\{e_i\} \subset C(X)$, such that for every $\phi \in G$, $$(\phi^{-1})'(x) = \sum_i b_i e_i(x). \tag{72}$$

In other words, it is assumed that every element in the group and its derivative can be represented as a convergent series of basis functions of the separable space C(X). Our goal then, is to obtain the expansion of $\phi^{-1}(x)$ with respect to the basis functions $\{e_i(x)\}$. In practice, the series (72) is replaced by a finite sum, i.e., we have $1 \leq i \leq m$.

Let $z = \phi(x)$. Then $\phi^{-1}(z) = x$, and hence $$(\phi^{-1})'(z)dz = dx \tag{73}$$

Let $\{w_p\}_{p=1}^{P}: Y \to R$ be a set of continuous functions that separate the points of Y. Hence, these functions separate the points of the image of h (and g). As we show next, these functions are employed to translate the identity relation (140) into a set of P equations:

$$\int_{-\infty}^{\infty} w_p(h(x))dx = \int_{-\infty}^{\infty} w_p(g(\phi(x)))dx \tag{74}$$
$$= \int_{-\infty}^{\infty} (\phi^{-1}(z))' w_p(g(z))dz$$
$$= \sum_{i=1}^{m} b_i \int_{-\infty}^{\infty} e_i(x) w_p(g(x))dx$$
$$p = 1, \ldots, P$$

Rewriting (74) in a matrix form we have $$\begin{pmatrix} \int w_1 \circ h \\ \vdots \\ \int w_p \circ h \end{pmatrix} = \begin{pmatrix} \int e_1 w_1 \circ g & \cdots & \int e_m w_1 \circ g \\ \vdots & \ddots & \vdots \\ \int e_1 w_p \circ g & \cdots & \int e_m w_p \circ g \end{pmatrix} \begin{pmatrix} b_1 \\ \vdots \\ b_m \end{pmatrix} \tag{75}$$

We thus have the following theorem:

Theorem: The homeomorphism $\phi$ satisfying the parametric model defined in (71) is uniquely determined if the matrix $$\begin{pmatrix} \int e_1 w_1 \circ g & \cdots & \int e_m w_1 \circ g \\ \vdots & \ddots & \vdots \\ \int e_1 w_p \circ g & \cdots & \int e_m w_p \circ g \end{pmatrix} \tag{76}$$

is full rank.

Thus, provided that $\{w_p\}_{p=1}^{P}$, are chosen such that (76) is full rank, the system (75) (in the absence of noise we take P=m) can be solved for the parameter vector $[b_1, \ldots, b_m]$. It is clear that in the absence of noise, any set of functions $\{w_p\}_{p=1}^{m}$ such that (76) is full rank is equally optimal. As we show next the situation is remarkably different in the presence of observation noise. Since the solution for the case where the signals are of higher dimension follows from similar arguments we first present the method for estimating multi-dimensional deformations before addressing the solution to the case where the observations are noisy.

3. Estimation of 2-D Deformations

Let S be some compact subset of $R^2$. Consider the general case where $h: S \to R$ and $g: S \to R$ are bounded and measurable functions, such that $$h(x,y) = g(\phi(x,y)) \quad (77)$$

where $$\phi(x,y) = (u,v) = (\phi_1(x,y), \phi_2(x,y)) \quad (78)$$

In the following we assume that G is the group of 2-D differentiable homeomorphisms such that for each $\phi \in G$, both $\phi_1$ and $\phi_2$ have a continuous and differentiable inverse, where the partial derivatives of the inverse are also continuous. More precisely, let C(S) denote the set of continuous real-valued transformations from S to R. By the above assumption every $$\phi, \frac{\partial \phi_1}{\partial x}, \frac{\partial \phi_1}{\partial y} \in C(S), \phi_2, \frac{\partial \phi_2}{\partial x}, \frac{\partial \phi_2}{\partial y} \in C(S).$$

Thus, an equivalent form of (77) is $$g(u,v) = h(\phi_1^{-1}(u,v), \phi_2^{-1}(u,v)) \quad (79)$$

Since C(S) is a normed separable spaces, we assume that there exists a countable set of basis functions $\{e_i(x,y)\} \subset C(S)$, such that for every $\phi \in G$, $$\phi_1(x,y) = \sum_i a_i e_i(x,y) \quad (80)$$

$$\phi_2(x,y) = \sum_i b_i e_i(x,y)$$

In other words, it is assumed that for every element $\phi$ in the group, each of the functions $\phi_1, \phi_2$ and their partial derivatives can be represented as convergent series of basis functions of the separable space C(X). Let J(x,y) denote the Jacobian of the transformation, i.e., $$J(x,y) = \begin{vmatrix} \frac{\partial \phi_1}{\partial x} & \frac{\partial \phi_1}{\partial y} \\ \frac{\partial \phi_2}{\partial x} & \frac{\partial \phi_2}{\partial y} \end{vmatrix} \quad (81)$$

Substituting the parametric representation (80) into (81), we obtain a parametric representation of the Jacobian in terms of the parameters $\{a_i\}, \{b_i\}$.

Let $\{w_p\}_{p=1}^P : R \to R$ be a set of continuous functions that separate the points of R. Since these functions separate the points of the image of h (and g) they are employed to translate the identity relation (77) into a set of P linearly independent equations that can be solved first for the parametric representation of the Jacobian, and in a second stage for the parameters $\{a_i\}, \{b_i\}$. Thus, $$\int_{-\infty}^{\infty} \int_{-\infty}^{\infty} w_p(g(u,v)) \, du \, dv = \quad (82)$$

$$\int_{-\infty}^{\infty} \int_{-\infty}^{\infty} w_p(h(\phi_1^{-1}(u,v), \phi_2^{-1}(u,v))) \, du \, dv =$$

$$\int_{-\infty}^{\infty} \int_{-\infty}^{\infty} J(x,y) w_p(h(x,y)) \, dx \, dy$$

By substituting J(x,y) in the system (82) with it parametric model, and solving the system, an estimate of the Jacobian is obtained. Once the Jacobian of the coordinate transformation is available, the parametric models of the homeomorphisms can be determined using the following approach:

$$\int_{-\infty}^{\infty} \int_{-\infty}^{\infty} u w_p(g(u,v)) \, du \, dv = \quad (83)$$

$$\int_{-\infty}^{\infty} \int_{-\infty}^{\infty} u w_p(h(\phi_1^{-1}(u,v), \phi_2^{-1}(u,v))) \, du \, dv =$$

$$\int_{-\infty}^{\infty} \int_{-\infty}^{\infty} J(x,y) \phi_1(x,y) w_p(h(x,y)) \, dx \, dy =$$

$$\int_{-\infty}^{\infty} \int_{-\infty}^{\infty} J(x,y) \sum_i a_i e_i(x,y) w_p(h(x,y)) \, dx \, dy =$$

$$\sum_i a_i \int_{-\infty}^{\infty} \int_{-\infty}^{\infty} J(x,y) e_i(x,y) w_p(h(x,y)) \, dx \, dy$$

and $$\int_{-\infty}^{\infty} \int_{-\infty}^{\infty} v w_p(g(u,v)) \, du \, dv = \quad (84)$$

$$\int_{-\infty}^{\infty} \int_{-\infty}^{\infty} v w_p(h(\phi_1^{-1}(u,v), \phi_2^{-1}(u,v))) \, du \, dv =$$

$$\int_{-\infty}^{\infty} \int_{-\infty}^{\infty} J(x,y) \phi_2(x,y) w_p(h(x,y)) \, dx \, dy =$$

$$\int_{-\infty}^{\infty} \int_{-\infty}^{\infty} J(x,y) \sum_i b_i e_i(x,y) w_p(h(x,y)) \, dx \, dy =$$

$$\sum_i b_i \int_{-\infty}^{\infty} \int_{-\infty}^{\infty} J(x,y) e_i(x,y) w_p(h(x,y)) \, dx \, dy$$

The motivation for choosing this approach is that it enables us to directly "translate" the parametric model of the coordinate transformation into a set of linear equations. Example: Let $\{e_i\}$ be the set of 2-D polynomials functions on X×Y. The polynomials are further assumed to be of some finite order n in each of their variables. Hence, we have $$\phi_1(x,y) = \sum_{i=0}^{n} \sum_{j=0}^{n} a_{i,j} x^i y^j = x_n^T A y_n \quad (85)$$

$$\phi_2(x,y) = \sum_{i=0}^{n} \sum_{j=0}^{n} b_{i,j} x^i y^j = x_n^T B y_n$$

where we define $x_n = [1, x, \ldots, x^n]^T, y_n = [1, y, \ldots, y^n]^T$. Hence, $$J(x,y) = \begin{vmatrix} \dot{x}_n^T A y_n & x_n^T A \dot{y}_n \\ \dot{x}_n^T A y_n & x_n^T A \dot{y}_n \end{vmatrix} = x_{2n}^T C y_{2n} \quad (86)$$

and (82) yields the system $$\int_{-\infty}^{\infty} \int_{-\infty}^{\infty} w_p(g(u,v)) \, du \, dv = \int_{-\infty}^{\infty} \int_{-\infty}^{\infty} w_p(h(x,y)) x_{2n}^T C y_{2n} \, dx \, dy \quad (87)$$

Since the composing set of functions is known, the system of P equations (87) can be solved by a least squares solution for the $4n^2 \leq P$ unknown elements of C, and hence for J(x,y). Once the Jacobian of the coordinate transformation is available, the parametric models of the homeomorphisms are determined by substituting their polynomial models into (83) and (84):

$$\int_{-\infty}^{\infty}\int_{-\infty}^{\infty} u w_p(g(u,v))\,du\,dv = \qquad (88)$$

$$\int_{-\infty}^{\infty}\int_{-\infty}^{\infty} (X_{2n}^T C Y_{2n})(X_n^T A Y_n) w_p(h(x,y))\,dx\,dy \text{ and}$$

$$\int_{-\infty}^{\infty}\int_{-\infty}^{\infty} v w_p(g(u,v))\,du\,dv = \qquad (89)$$

$$\int_{-\infty}^{\infty}\int_{-\infty}^{\infty} (X_{2n}^T C Y_{2n})(X_n^T B Y_n) w_p(h(x,y))\,dx\,dy$$

As an illustrative example consider the image shown in FIG. 6. The image on the right shows a severely deformed version of the original image. The deformation is composed of both homeomorphic and affine transformations. The deformation is estimated using only the two images: the original and the deformed, by employing a two-dimensional version of the algorithm briefly introduced earlier. Having estimated the deformation, its inverse is applied to the deformed image on the right, to produce the registered image on the left, which is virtually identical to the original image (not shown here). This example demonstrates that image registration is possible despite the severe deformation, and can be implemented as a solution to a linear system of equations.

4. Observations Subject to Additive Noise: The Least Squares Solution

In the presence of noise the observed data is given by $$h(x) = g(\phi(x)) + \eta(x). \qquad (90)$$

Assuming that the noise has a zero mean, and that its higher order statistics are known, we first address questions related to issue of the optimal choice of the set $\{w_p\}$ for each template function g. We begin by adapting the solution derived in the previous section for the deterministic case, to a least squares solution for the model parameters. In the presence of noise the basic equation (74) becomes $$\int_{-\infty}^{\infty} w_p(h(x))\,dx = \int_{-\infty}^{\infty} w_p[g(\phi(x)) + \eta(x)]\,dx \qquad (91)$$

$$= \int_{-\infty}^{\infty} w_p[g(z) + \eta(\phi^{-1}(z))](\phi^{-1})'(z)\,dz$$

$$= \int_{-\infty}^{\infty} w_p(g(z))(\phi^{-1})'(z)\,dz + \varepsilon_p^g$$

where we define the random variable $$\varepsilon_p^g = \int_{-\infty}^{\infty} \{w_p[g(z)+\eta(\phi^{-1}(z))] - w_p(g(z))\}(\phi^{-1})'(z)\,dz \qquad (92)$$

$$= \int_{-\infty}^{\infty} \{w_p[g(\phi(x))+\eta(x)] - w_p(g(\phi(x)))\}\,dx$$

Substituting (72) into (91), we obtain the linear system of equations $$\int_{-\infty}^{\infty} w_p(h(x))\,dx = \sum_i b_i \int_{-\infty}^{\infty} e_i(x) w_p[g(x)]\,dx + \varepsilon_p^g \quad p=1,\ldots,P \qquad (93)$$

The system (93) represents a linear regression problem where the noise sequence $\{\varepsilon_p^g\}$ is non-stationary since its statistical moments depend on the choice of $w_p$ for each p. The regressors are functions of $w_p$ and the template g, and hence are deterministic. Provided that the sequence of composition functions $\{w_p\}_{p=1}^P$, is chosen such that the resulting regressors matrix is full rank, the system (93) is solved by a linear least squares method such that the $l_2$ norm of the noise vector is minimized. The dependence of the noise sequence $\{\varepsilon_p^g\}$ on the choice of $w_p$ suggests that different choices of the composition sequence $\{w_p\}_{p=1,P}$ may provide different solutions. We shall be first interested in systems such that for each p, the linear constraint imposed by $w_p$ is unbiased (and thus the "effective noise" that corresponds to each $w_p$, is zero mean).

5. Construction of Unbiased Linear Constraints

Consider the case where we choose $w_p(x) = \Sigma_k \alpha_k^P x^k$, and the additive noise is white, Gaussian with zero mean and variance $\sigma^2$. We next evaluate the mean term, $E\varepsilon_p^g$, of the "effective noise", so that a correction term can be introduced such that the non-zero-mean error term $\varepsilon_p^g$ in (92) is replaced by a zero mean error term. To simplify the notation we will take advantage of linear structure of $w_p(x)$, and analyze only the case where $w_p(x) = x^p$ and the generalization is straightforward. Thus, in this case $$\varepsilon_p^g = \int_{-\infty}^{\infty} \{[g(z)+\eta(\phi^{-1}(z))]^p - g^p(z)\}(\phi^{-1})'(z)\,dz \qquad (94)$$

$$= \int_{-\infty}^{\infty} \sum_{j=1}^{p} \binom{p}{j} g^{p-j}(z) \eta^j(\phi^{-1}(z))(\phi^{-1})'(z)\,dz$$

Since the noise is Gaussian with zero mean, all terms involving odd order moments of the noise vanish and hence $$E\varepsilon_p^g = \sum_{j=1}^{[\frac{p}{2}]} \binom{p}{2j} E[\eta^{2j}(\phi^{-1}(z))] \int_{-\infty}^{\infty} g^{p-2j}(z)(\phi^{-1})'(z)\,dz \qquad (95)$$

$$= \sum_i b_i \sum_{j=1}^{[\frac{p}{2}]} \binom{p}{2j} E[\eta^{2j}(\phi^{-1}(z))] \int_{-\infty}^{\infty} g^{p-2j}(z) e_i(z)\,dz$$

and $E[\eta^{2j}(\phi^{-1}(z))]$ is a constant which is a function of only the index 2j of the even order moment, and of $\sigma^2$.

Hence, for the case where $w_p(x) = x^p$, the zero-mean-noise version of (93) becomes $$\int_{-\infty}^{\infty} h^p(x)\,dx = \sum_i b_i \left\{ \int_{-\infty}^{\infty} e_i(z) g^p(z)\,dz + \sum_{j=1}^{[\frac{p}{2}]} \binom{p}{2j} E[\eta^{2j}(\phi^{-1}(z))] \int_{-\infty}^{\infty} g^{p-2j}(z) e_i(z)\,dz \right\} + \tilde{\varepsilon}_p^g \qquad (96)$$

where $\tilde{\varepsilon}_p^g$ is a zero mean random variable.

Thus the system (96) represents a different linear regression problem where the observation noise is non-stationary, but with a zero mean. The regressors are functions of $w_p$, the template g, and the known statistics of the noise. Hence the regressors are deterministic. Provided that the resulting regressors matrix is full rank, the system (96) is solved by a linear least squares method such that $\Sigma_{p=1}^{P}|\in_p^g|^2$ is minimized.

6. Analysis of the High SNR Case

In this section we analyze the proposed method assuming $w_p(x)=x^p$, when it is assumed that the signal to noise ratio is high.

To achieve improved numerical stability in the presence of noise, in the following, we consider the normalized version of the system (93), i.e., $$\frac{1}{\int_{-\infty}^{\infty} g^P(x)dx} \int_{-\infty}^{\infty} h^P(x)dx = \qquad (97)$$

$$\sum_i b_i \frac{1}{\int_{-\infty}^{\infty} g^P(x)dx} \int_{-\infty}^{\infty} e_i(x)[g^P(\phi(x))]dx + \bar{\in}_p^g \ p = 1, \ldots, P$$

Since $h(x)=g(\phi(x))+\eta(x)$ we have under the high SNR assumption that the contribution of high noise powers can be neglected, i.e., $$h^P(x) \approx g^P(\phi(x)) + p\eta(x)g^{P-1}(\phi(x)) \qquad (98)$$

Hence, the error term in (92) is approximated under the high SNR assumption by $$\bar{\in}_p^g = \frac{p}{\int_{-\infty}^{\infty} g^P(x)dx} \int_{-\infty}^{\infty} \eta(x) g^{P-1}(\phi(x))dx \qquad (99)$$

$$= c_p \int_{-\infty}^{\infty} \eta(x) g^{P-1}(\phi(x))dx \ p = 1, \ldots, P$$

where we define $$c_p = p \bigg/ \int_{-\infty}^{\infty} g^P(x)dx.$$

Clearly, $E[\in_p^g]=0$, $p=1, \ldots, P$. We next evaluate the error covariances of the system, under the high SNR assumption. Let $\in^g=[\in_1^g, \ldots, \in_P^g]^T$ and $\Gamma = E[\in^g(\in^g)^T]$. Thus, the (k,l) element of $\Gamma$ is given by $$\Gamma_{k,l} = c_k c_l E\left[\int_{-\infty}^{\infty} \eta(x)g^{k-1}(\phi(x))dx \int_{-\infty}^{\infty} \eta(y)g^{l-1}(\phi(y))dy\right] \qquad (100)$$

$$= c_k c_l \sigma^2 \int_{-\infty}^{\infty} g^{k+l-2}(\phi(x))dx$$

$$= c_k c_l \sigma^2 \int_{-\infty}^{\infty} (\phi^{-1}(z))' g(z)^{k+l-2} dz$$

$$= c_k c_l \sigma^2 \sum_i b_i \int_{-\infty}^{\infty} e_i(z)g(z)^{k+l-2} dz$$

Rewriting (100) in matrix form we have $$\Gamma = \sigma^2 \sum_i b_i u_i \text{ where} \qquad (101)$$

$$u_i = \begin{pmatrix} c_1^2 \int_{-\infty}^{\infty} e_i(z)dz & \cdots & c_1 c_P \int_{-\infty}^{\infty} e_i(z)g(z)^{P-1}dz \\ \vdots & \ddots & \vdots \\ c_1 c_P \int_{-\infty}^{\infty} e_i(z)dz & \cdots & c_P^2 \int_{-\infty}^{\infty} e_i(z)g(z)^{2P-2}dz \end{pmatrix} \qquad (102)$$

7. Maximum Likelihood Estimation of the Homeomorphism

As we illustrate below, the LS algorithm for estimating the homeomorphism parameters is accurate and computationally simple as it requires only the solution of a set of linear equations. In particular there is no need for an iterative solution. Nevertheless, in cases where the performance of this algorithm is not sufficient, it can serve to initialize the more complex maximum likelihood estimator (MLE) of the parameters, which we derive in this section.

Assuming the observation noise n(x) is Gaussian, we have under the high SNR assumption that $\in^g$ is a zero mean Gaussian random vector with covariance matrix $\Gamma$ given in (101). Rewriting (93) in a matrix form, assuming the high SNR assumption we have $$h = Gb + \in^g \qquad (103)$$

where $$h = \left[\int_{-\infty}^{\infty} w_1(h(x))dx, \ldots, \int_{-\infty}^{\infty} w_P(h(x))dx\right]^T,$$

and G is a P×m matrix such that $$G_{k,l} = \int_{-\infty}^{\infty} e_k(x) w_l[g(x)]dx.$$

Hence the log-likelihood function for the observation vector h is given by $$\log p(h; b) = \qquad (104)$$

$$-\frac{m}{2}\log(2\pi) - \frac{1}{2}\log(|\Gamma|) - \frac{1}{2}(h-Gb)^T \Gamma^{-1}(h-Gb)$$

The MLE of the field parameters is found by maximizing log p(h;b) with respect to the model parameters b. Since this objective function is highly nonlinear in the problem parameters, the maximization problem cannot be solved analytically and we must resort to numerical methods. In order to avoid the enormous computational burden of an exhaustive search, we use the following two-step procedure. In the first stage we obtain a suboptimal initial estimate for the parameter vector b by using the algorithm described in Section 16. In the second stage we refine these initial estimates by an iterative numerical maximization of the log likelihood function. In our experiments we use the Broyden-Fletcher-Goldfarb-Shanno (BFGS) quasi-Newton optimization method. This algorithm requires evaluation of the first derivative of the objective function at each iteration:

$$\frac{\partial \log p(y;b)}{\partial b_i} = -\frac{1}{2} tr\left\{\Gamma^{-1}\frac{\partial \Gamma}{\partial \theta_i}\right\} + \qquad (105)$$

$$G_i^T\Gamma^{-1}(h-Gb) + \frac{1}{2}(h-Gb)^T\Gamma^{-1}\frac{\partial \Gamma}{\partial \theta_i}\Gamma^{-1}(h-Gb)^T$$

where $b_i$ is the ith element of b, $G_i$ denotes the ith column of G, and $$\frac{\partial \Gamma}{\partial \theta_i}\sigma^2 u_i \qquad (106)$$

8. Numerical Examples

In this section we present numerical examples to illustrate the operation and performance of the proposed model, and parameter estimation algorithm. In the first example we consider the case where the template function is given by $g(x) = \sin(\pi x) + 0.2 \sin(2\pi x) - 0.3 \sin(3\pi x) + 0.4 \sin(5\pi x)$ and the deformation is $\phi(x) = 0.6x - 0.4x^2 - 0.8x^3 + 1.6x^4$. The observed signal is $h(x) = g(\phi(x)) + n(x)$, where the noise is normally distributed with zero mean and variance of 0.04. The number of available samples of both the template and the noisy observation is 10000, so that the effects of both integration errors as well as of low sampling rates (and the resulting need for interpolating the data) are negligible. We illustrate the performance of the proposed solution using Monte Carlo simulations. The experimental results are based on 500 independent realizations of the observed signal. The estimator employed is the least-squares estimator. The top-left plot of FIG. 7 shows the template and a single noisy observation. The top-right plot shows the deforming function and the mean value of its estimates. The two plots on the bottom depict the bias and the mean squared error in estimating the deformation as a function of x (the deformation takes place along the x-axis).

The next example illustrates the operation of the proposed algorithm on an image of a real object. The image dimensions are 1170×1750. The top image in FIG. 8 depicts the original image of the aircraft, which is also employed as the template. In order to be able to evaluate the performance of the method the image of the object is then deformed, and a zero mean Gaussian observation noise is added—to obtain the simulated noisy observation of the aircraft. See the middle image. The deforming function (which takes place only along the x-axis) is depicted using a solid line in FIG. 9 along with the estimate (dotted line) obtained by applying the proposed solution to the noisy observation shown in FIG. 8. Finally, the estimated deformation is applied to the original template in order to obtain an estimate of the deformed object (lower image in FIG. 8) which can be compared with the deformed noisy object shown in the middle image.

This invention addresses the problem of finding the homeomorphic transformation relating a given observation on a planar object with some pre-chosen template of this object. The direct approach for estimating the transformation is to apply each of the deformations in the group to the template in a search for the deformed template that matches the observation. The disclosed method employs a set of non-linear operators to replace this high dimensional problem by an equivalent linear problem, expressed in terms of the unknown transformation model parameters. Thus, the problem of finding the parametric model of the deformation is mapped, by this set on non-linear operators, into a set of linear equations which is then solved for the transformation parameters. The proposed solution has been further extended to include the case where the deformation relating the observed signature of the object and the template, is composed of both a geometric deformation due to the transformation of the coordinate system, and a constant illumination change. The proposed solution is unique and accurate and is applicable to essentially any continuous transformation regardless of the magnitude of the deformation.

The embodiments described above are given as examples of the method of the present invention. Those skilled in the art will be aware of various modifications of the present invention. These variations are to be included in the spirit of the present invention.

What is claimed is:

1. A method for comparing appearances of an object comprising:
   (a) creating a set of templates of objects, wherein each object is described by a set of functions that is not limited to edge information;
   (b) observing one of said objects subject to an unknown elastic transformation and creating a set of functions to describe the whole of the observed object that is not limited to edge information;
   (c) applying a set of nonlinear functions to the set of functions of the observed object and the set of functions of at least one template to establish a linear relationship between the two; and
   (d) solving the linear relationship of (c) to determine the transformation parameters that when applied to the template will produce the observed object.

2. The method of claim 1, wherein the transformation parameters reduce a high dimensional calculation to a linear parametric estimation.

3. The method of claim 2, wherein the method is used for motion analysis, image registration, or object recognition.

4. The method of claim 2, wherein a set of non-linear operators is used to determine the transformation parameters and replace the high dimensional non-convex optimization with the linear parametric estimation.

5. The method of claim 4, in the special case of affine transformation, wherein the estimation is exact.

6. The method of claim 1, wherein a sequence of observations is made and processed to produce a single parametric time varying model for evolution of appearances of an object over time.

7. The method of claim 1, wherein the measured amplitudes of the observed object are transformed by illumination gain and blur.

\* \* \* \* \*